(12) United States Patent
Sheng et al.

(10) Patent No.: US 12,407,460 B2
(45) Date of Patent: Sep. 2, 2025

(54) ELECTRONIC DEVICE AND METHOD FOR WIRELESS COMMUNICATIONS, AND COMPUTER-READABLE STORAGE MEDIUM

(71) Applicant: Sony Group Corporation, Tokyo (JP)

(72) Inventors: Bin Sheng, Jiangsu (CN); Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 539 days.

(21) Appl. No.: 17/798,083

(22) PCT Filed: Mar. 4, 2021

(86) PCT No.: PCT/CN2021/079021
§ 371 (c)(1),
(2) Date: Aug. 8, 2022

(87) PCT Pub. No.: WO2021/179981
PCT Pub. Date: Sep. 16, 2021

(65) Prior Publication Data
US 2023/0155764 A1      May 18, 2023

(30) Foreign Application Priority Data
Mar. 11, 2020   (CN) .......................... 202010165600.9

(51) Int. Cl.
*H04L 5/00* (2006.01)
*H04B 7/0413* (2017.01)
(Continued)

(52) U.S. Cl.
CPC ......... *H04L 5/0048* (2013.01); *H04B 7/0413* (2013.01); *H04W 72/0457* (2023.01); *H04W 72/541* (2023.01); *H04W 76/15* (2018.02)

(58) Field of Classification Search
None
See application file for complete search history.

(56) References Cited

U.S. PATENT DOCUMENTS

| 2005/0041757 A1 | 2/2005 | Rosen |
| 2016/0105233 A1 | 4/2016 | Jalali |

(Continued)

FOREIGN PATENT DOCUMENTS

| CN | 101199148 A | 6/2008 |
| CN | 107980239 A | 5/2018 |

(Continued)

OTHER PUBLICATIONS

International Search Report and Written Opinion mailed on May 27, 2021, received for PCT Application PCT/CN2021/079021, filed on Mar. 4, 2021, 9 pages including English Translation.

(Continued)

*Primary Examiner* — Saumit Shah
(74) *Attorney, Agent, or Firm* — XSENSUS LLP

(57) ABSTRACT

The present invention provides an electronic device and method for wireless communications, and a computer readable storage medium. The electronic device comprises: a processing circuit, configured to divide an available pilot frequency into a plurality of orthogonal subsets, and allocate a pilot frequency in a first subset for an unmanned aerial vehicle (UAV) device, wherein the first subset is different from a second subset allocated for another UAV device in an adjacent sector of a different cell, and is different from a third subset allocated for a ground UE located in the same sector as the UAV device.

15 Claims, 19 Drawing Sheets

(51) Int. Cl.
*H04W 72/0457* (2023.01)
*H04W 72/541* (2023.01)
*H04W 76/15* (2018.01)

(56) References Cited

U.S. PATENT DOCUMENTS

| | | | |
|---|---|---|---|
| 2017/0126309 A1 | 5/2017 | Rupasinghe et al. | |
| 2018/0102832 A1* | 4/2018 | Chang | H04B 7/18504 |
| 2020/0100187 A1* | 3/2020 | Balasubramanian | H04B 17/345 |
| 2020/0107237 A1* | 4/2020 | Mangalvedhe | G08G 5/26 |
| 2020/0245340 A1* | 7/2020 | Zhang | H04J 11/005 |
| 2022/0029696 A1* | 1/2022 | Chaves | H04B 7/18504 |
| 2022/0240288 A1* | 7/2022 | Yang | H04L 5/0094 |

FOREIGN PATENT DOCUMENTS

| | | | | |
|---|---|---|---|---|
| CN | 109525365 A | 3/2019 | | |
| CN | 109818721 A | 5/2019 | | |
| CN | 110535524 A | 12/2019 | | |
| WO | WO-2019056983 A1 * | 3/2019 | | H04B 7/185 |

OTHER PUBLICATIONS

Interdigital, "Review of UAS service requirements", 3GPP TSG-SA WG6 Meeting #35, S6-200262, Jan. 13-17, 2020, 5 pages.
China Master's Theses Full-text Database, Apr. 15, 2022, Luo Chenmeng, Research on Hybrid Beamforming, Full text.
IEEE Transactions on Vehicular Technology, Sep. 03, 2019, Muhammad Farhan Sohail; Chee Yen Leow; SeungHwan Won, "Energy-Efficient Non-Orthogonal Multiple Access for UAV Communication System" Full text.

* cited by examiner

| Division of pilot subsets | | | | | | |
|---|---|---|---|---|---|---|
| Subset | I | | II | | III | |
| Pilot | P1 | P2 | P3 | P4 | P5 | P6 |

| Allocation of pilot subsets | | | |
|---|---|---|---|
| Area | Sector C of Cell 3 | Sector A of Cell 1 | Sector B of Cell 2 |
| UAV | I | II | III |
| GUE | II,III | I, III | I,II |

| Allocation of pilot subsets for UAV | | | |
|---|---|---|---|
| Sector | Sector C of Cell 3 | Sector A of Cell 1 | Sector B of Cell 2 |
| Subset | I | II | III |

| | Cell 1 and Cell 2 | |
|---|---|---|
| Pilot | P1 | P2 |
| UAV x | $\bar{\varphi}_x^{P1}$ | $\bar{\varphi}_x^{P2}$ |
| UAV y | $\bar{\varphi}_y^{P1}$ | $\bar{\varphi}_y^{P2}$ |

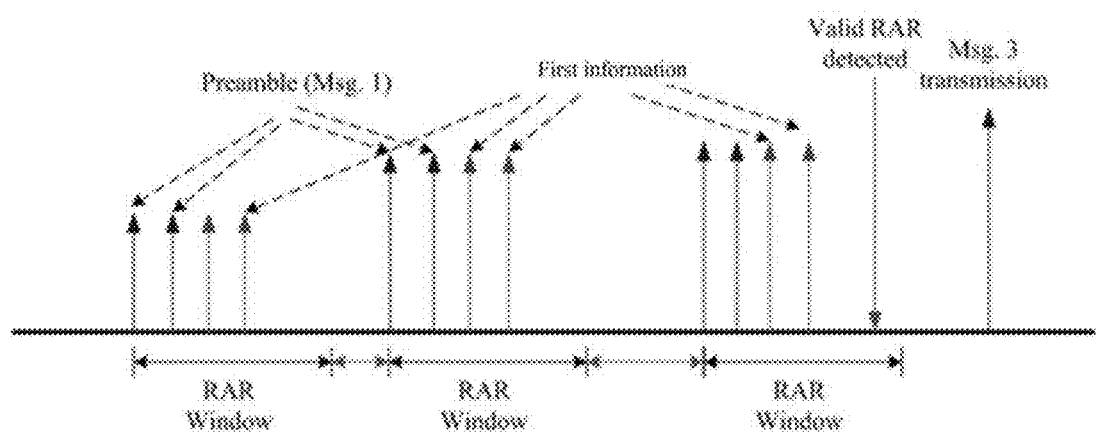
Figure 13
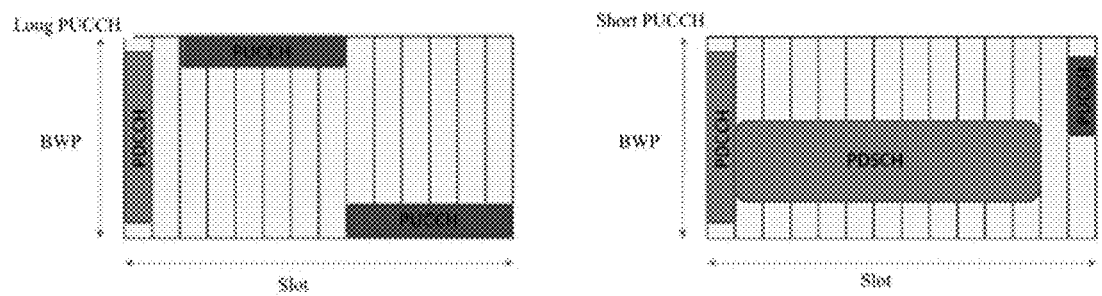
Figure 14
| Index | Direction | MAC CE Type |
|---|---|---|
| 10000 | UL | Flight path command |
Figure 15

ELECTRONIC DEVICE AND METHOD FOR WIRELESS COMMUNICATIONS, AND COMPUTER-READABLE STORAGE MEDIUM

CROSS-REFERENCE TO RELATED APPLICATIONS

This application is based on PCT filing PCT/CN2021/079021, filed on Mar. 4, 2021, which claims priority to Chinese Patent Application No. 202010165600.9, titled "ELECTRONIC DEVICE AND METHOD FOR WIRELESS COMMUNICATIONS, AND COMPUTER-READABLE STORAGE MEDIUM", filed on Mar. 11, 2020 with the China National Intellectual Property Administration, each of which is incorporated herein by reference in its entirety.

FIELD

The present disclosure relates to the technical field of wireless communications, and in particular to a pilot multiplexing technology in a massive MIMO (Multiple-In-Multiple-Out) communication system. More particularly, the present disclosure relates to an electronic apparatus and a method for wireless communications, and a computer-readable storage medium.

BACKGROUND

In a 5G cellular network, each base station is equipped with a large number of MIMO arrays, providing capabilities of digital beam-forming and spatial multiplexing. In a case of multiple users, the base station may serve multiple users on a same PRB (Physical Resource Block) through beamforming, so that system capacity and spectrum utilization efficiency are improved.

In a mobile communication system, channel information is required to be known in advance to perform detection and decoding of the received data. For example, a pilot-assisted channel estimation method may be used for channel estimation. Ideally, pilots that are orthogonal to each other are allocated to different UEs (User Equipment). However, since a length of pilot is limited by a channel coherence length, the number of orthogonal pilots is limited, and pilot reuse inevitably occurs among different cells. In this case, for UEs in different cells adopting the same pilot sequence, the pilot signals sent by the UEs may be received by a base station of an adjacent cell. However, the base station cannot effectively distinguish these pilot signals, resulting in interferences in uplink channel estimation at the base station. When the base station uses an interfered channel estimation to perform uplink data detection, in addition to data sent from UEs in the cell of the base station, the base station would also receive data from UEs in other cells, thereby causing inter-cell interferences on the uplink. When the base station uses the interfered channel estimation to generate a pre-coding matrix and transmits downlink data, in addition to the UEs in the cell of the base station, the UEs in other cells would also receive the data, thereby causing inter-cell interferences on the downlink. The above conditions, known as pilot contamination, results in a significant reduce of a transmission data rate.

In addition, with the diversification of UEs, users in a cell include not only ground UEs (GUEs), but also aerial user terminals, such as UAVs (Unmanned Aerial Vehicles), working at a certain altitude. As a flight altitude of a UAV increases, a wireless signal transmitted from the UAV usually experiences LOS (Line Of Sight) signal propagation, which is more likely to produce interferences to a ground UE. In this case, an impact resulted from the pilot contamination is more significant.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry configured to: divide available pilots into a plurality of subsets orthogonal to each other; and allocate a pilot within a first subset to an unmanned aerial vehicle (UAV) device. The first subset is different from a second subset allocated to another UAV device located within an adjacent sector of a different cell, and the first subset is different from a third subset allocated to a ground UE located within a same sector as the UAV device.

According to another aspect of the present disclosure, a method for wireless communications is provided, including: dividing available pilots into a plurality of subsets orthogonal to each other; and allocating a pilot within a first subset to an unmanned aerial vehicle (UAV) device. The first subset is different from a second subset allocated to another UAV device located within an adjacent sector of a different cell, and the first subset is different from a third subset allocated to a ground UE located within a same sector as the UAV device.

According to an aspect of the present disclosure, an electronic apparatus for wireless communications is provided. The electronic apparatus includes processing circuitry configured to: report, to a base station, information of a three-dimensional spatial location of a UAV device; and determine a pilot allocated by the base station to the UAV device based on the information. The allocated pilot belongs to a first subset of the available pilots, the first subset is different from a second subset which is allocated to another UAV device located within an adjacent sector of a different cell, and the first subset is different from a third subset which is allocated to a ground UE located within a same sector as the UAV device.

According to another aspect of the present disclosure, a method for wireless communications is provided, including: reporting, to a base station, information of a three-dimensional spatial location of a UAV device; and determining a pilot allocated by the base station to the UAV device based on the information. The allocated pilot belongs to a first subset of the available pilots, the first subset is different from a second subset which is allocated to another UAV device located within an adjacent sector of a different cell, and the first subset is different from a third subset which is allocated to a ground UE located within a same sector as the UAV device.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and the method in the embodiments of the present disclosure, a UAV and a ground UE are distinguished from each other and a pilot allocation strategy for the UAV is adopted, so that interferences between the UAV and the ground UE is minimized.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 13 shows an example of a location of first information;

FIG. 14 shows an example of a location of time-frequency resources for NR PUCCH;

FIG. 15 shows an example of a newly added MAC CE type;

DETAILED DESCRIPTION

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
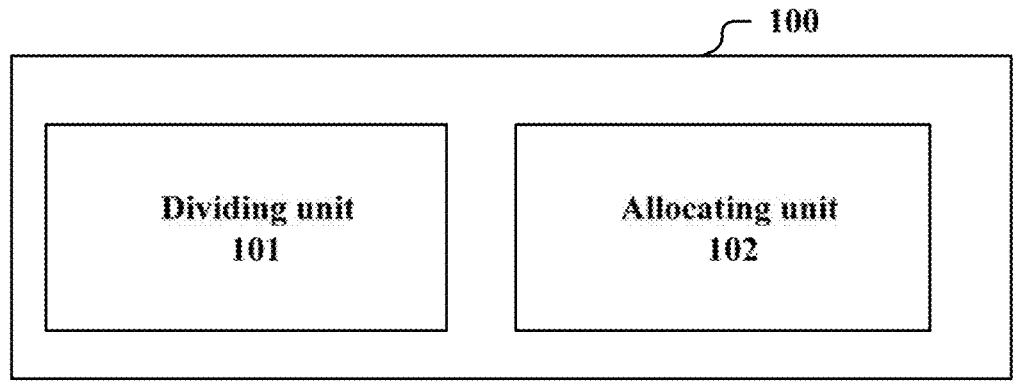
FIG. 1 shows a block diagram of functional modules of an electronic apparatus for wireless communications according to an embodiment of the present disclosure.

FIG. 1 shows a block diagram of functional modules of an electronic apparatus 100 for wireless communications according to an embodiment of the present disclosure. As shown in FIG. 1, the electronic apparatus 100 includes: a dividing unit 101 configured to divide available pilots into multiple subsets orthogonal to each other; and an allocating unit 102 configured to allocate a pilot within a first subset to a UAV device. The first subset is different from a second subset allocated to another UAV device located within an adjacent sector of a different cell; and the first subset is different from a third subset allocated to a ground UE located within the same sector as the UAV device.

The dividing unit 101 and the allocating unit 102 may be implemented by one or more processing circuits, and the processing circuits may be implemented as a chip or a processor, for example. Moreover, it should be understood that each functional unit in the electronic apparatus shown in FIG. 1 is only a logical module divided according to the specific functions implemented by the functional units, and is not used to limit the specific implementation manner.

The electronic apparatus 100 may be provided on a base station side or communicatively connected to a base station. The base station described in the present disclosure may be a transmit receive point (TRP) or an access point (AP). Here, it should be noted that the electronic apparatus 100 may be implemented in a chip level or an apparatus level. For example, the electronic apparatus 100 may function as the base station itself, and may further include an external apparatus such as a storage device and a transceiver (not shown). The storage device may be configured to store programs required for performing various functions by the base station and related data information. The transceiver may include one or more communication interfaces to support communication with different apparatus (for example, UE and another base station, etc.). An implementation of the transceiver is not specifically limited here.

For example, the dividing unit 101 may divide, through a network, available pilots into multiple subsets orthogonal to each other, that is, pilots in different subsets are orthogonal to each other. Exemplarily, the dividing unit 101 may determine a scheme for dividing the pilots into subsets through interaction with other base stations or a central management apparatus.

The allocating unit 102 is configured to perform pilot allocation for a UAV device in a present cell (also referred to as a serving cell) according to a rule proposed in the embodiments. In addition, the allocating unit 102 may also perform pilot allocation for a ground UE in the serving cell. For example, the allocating unit 102 allocates a pilot within a first subset to the UAV device in the present cell, and allocates a pilot within a third subset to the ground UE in the present cell. Another UAV device in an adjacent sector of a different cell which is adjacent to the sector where the UAV device is located is allocated with a pilot within a second subset. The first subset, the second subset, and the third subset are different from each other. In other words, the UAV devices in sectors adjacent to each other will use pilots orthogonal to each other, and the UAV device and the ground UE in the same sector will use pilots orthogonal to each other.

In an example, the division of the subsets may be performed statically. The allocating unit 102 is configured to reserve one or more subsets for the UAV device in each sector after the dividing unit 101 performs the division of the subsets.

In another example, the division of the subsets may be performed dynamically. The dividing unit 101 is configured to divide the pilots into subsets in response to access of a UAV device, and then the allocating unit 102 performs the allocating of the pilots. Dynamically dividing the pilots into subsets facilities to improve flexibility and pilot utilization efficiency.

Figure 2:
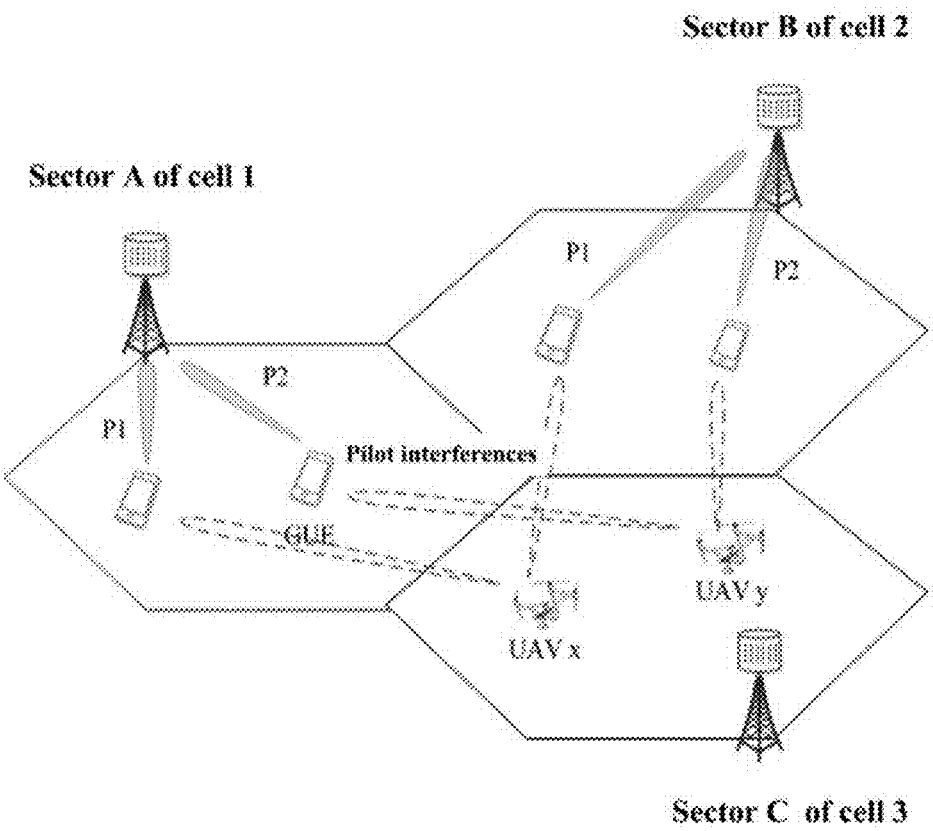
FIG. 2 shows an example of scenario of a massive MIMO communication system.

For ease of understanding, a specific example of division and allocation of pilots is given below with reference to FIG. 2. FIG. 2 shows an example of a scenario of a massive MIMO communication system. In the scenario of FIG. 2, it is assumed that the system includes three cells, i.e., cell 1, cell 2, and cell 3, and each of the cells is divided into three sectors, i.e., sector A, sector B, and sector C, which are covered by three massive antenna arrays of the base stations. It can be seen that sector A of cell 1, sector B of cell 2, and sector C of cell 3 are adjacent to each other, which easily results in pilot contamination. FIG. 2 schematically shows a situation in which a UAV in cell 3 produces pilot interferences to a ground UE (GUE) in cell 1 and a GUE in cell 2.

Figures 3, 4, 5, 6:
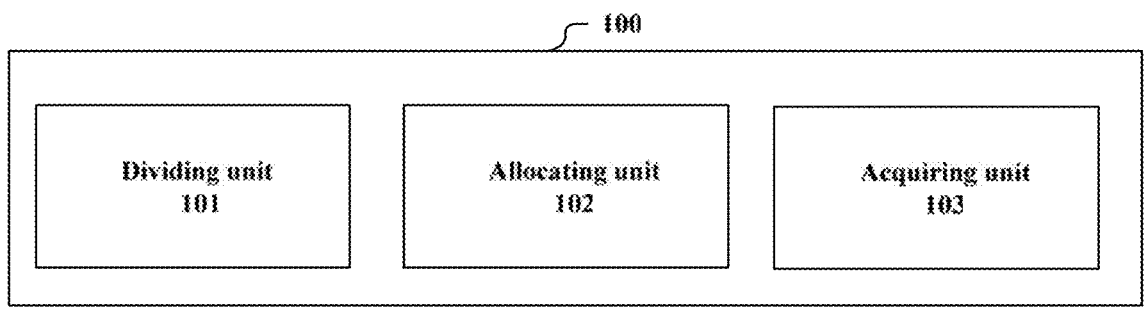
FIG. 3 shows an example of division of pilot subsets.
FIG. 4 shows an example of allocation of pilot subsets in the same sector.
FIG. 5 shows an example of allocation of pilot subsets for UAVs in respective sectors.
FIG. 6 shows a block diagram of functional modules of an electronic apparatus for wireless communications according to an embodiment of the present disclosure.

It is assumed that the system has 6 pilots orthogonal to each other, i.e., P1, P2, P3, P4, P5 and P6. According to the embodiment, the pilots may be divided into multiple subsets orthogonal to each other. FIG. 3 shows an example of division of the pilot subsets, in which P1 to P6 are divided into three subsets, and each of the subsets includes two pilots orthogonal to each other.

Based on FIG. 3, FIG. 4 shows an example of allocation of pilot subsets in the same sector. It can be seen that in each of the sectors, one subset is allocated to UAV and the other two subsets are allocated to GUE. FIG. 5 shows an example of allocation of pilot subsets in terms of UAVs in respective sectors. It can be seen that subsets allocated to UAVs in adjacent sectors are orthogonal to each other, so as to avoid mutual interferences.

It should be understood that the above illustration provides a schematic example of division and allocation of subsets, and the number of available pilots, the number of UAV devices, the number of GUE devices, and methods for division and allocation of subsets are not limited.

After a UAV accesses into the serving cell, the base station is to allocate a pilot within the first subset to the UAV. When there is a pilot in the first subset that is not allocated to a GUE in an adjacent sector, the pilot may be directly allocated to the UAV without considering a problem of pilot interferences. On the other hand, in a case that all pilots in the first subset have been allocated to GUEs in the adjacent sectors, it is desirable to adopt an allocation manner that minimizes the pilot interferences of the UAV to GUEs in adjacent sectors.

Taking the scenario of FIG. 2 as an example, there are multiple UAVs in each sector, such as UAV x and UAV y in cell 3, allocating pilot P1 in the first subset to UAV x and pilot P2 to UAV y would result in different interferences between the UAV and GUE than allocating pilot P2 to UAV x and P1 to UAV y. The embodiment proposes a pilot allocating method for minimizing such interferences, and an example thereof is specifically described as follows.

As shown in FIG. 6, the electronic apparatus 100 further includes an acquiring unit 103 configured to: acquire first information indicating a three-dimensional spatial location of the UAV device; and acquire second information indicating an angle of arrival (AOA) of a signal received by a base station of each adjacent cell from each ground UE (GUE) of the adjacent cell, where the angle of arrival includes a horizontal incident angle and a vertical incident angle.

The allocating unit 102 is configured to determine, based on at least a part of the first information and the second information, a difference between an AOA of a signal received by the base station of the adjacent cell from the UAV device and an AOA of a signal received by the base station of the adjacent cell from its ground UE in a case that the ground UE of the adjacent cell uses the same pilot as the UAV device; and allocate, to the UAV device, a pilot within the first subset which maximizes the difference.

Since the angle between directions of arrival (for example, represented by AOA) of two signals received by the same base station can reflect a strength of mutual interferences between the two signals, the allocating unit 102 allocates one of the available pilots which maximizes this angle to the UAV device, so as to reduce the pilot interferences produced by the UAV to the GUE of the adjacent cell as much as possible.

Since the base station adopts the massive MIMO technology, the AOA of the signal can be estimated. As the GUE of the adjacent cell has been allocated with a pilot, the base station of the adjacent cell is able to estimate the AOA of its signal arriving at the base station. The acquiring unit 103 is configured to acquire, from the adjacent base station, information of the angle of arrival of each GUE within the adjacent cell, that is, the second information.

In addition, the first information acquired by the acquiring unit 103 indicates the three-dimensional spatial location of the UAV device, for example, including a two-dimensional position and a flight altitude of the UAV device. Under an assumption that a certain pilot in the first subset is allocated to the UAV, the base station of the serving cell is able to calculate an AOA of an interference signal received from the UAV by the adjacent base station of the adjacent cell, based on the two-dimensional position and the flight altitude of the UAV device and an orientation and location of an antenna array of the adjacent base station (this is because that the orientation and location of the antenna array of the base station remain unchanged, and can be known by the serving base station in advance). In this way, the allocating unit 102 can calculate the difference, in a case of using the same pilot, between the AOA of the interference signal received from the UAV of the serving cell by the base station of the adjacent cell and the AOA of the signal received from the GUE of the adjacent cell by the base station of the adjacent cell, and select a pilot within the first subset such that the difference is maximized.

Figure 7:
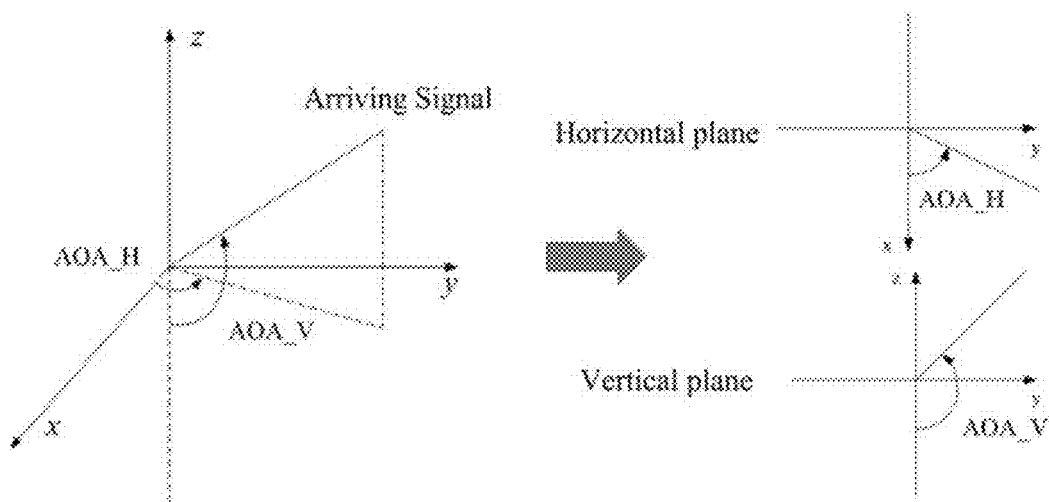
FIG. 7 shows a schematic example of an angle of arrival.

An AOA includes a horizontal incident angle AOA_H and a vertical incident angle AOA_V. FIG. 7 shows a schematic example of an AOA, in which: plane XOY is a horizontal plane; a positive direction of X axis is a reference direction; an angle between a projection of an arriving signal (received signal) onto the plane XOY and the positive direction of X axis is defined as the horizontal incident angle AOA_H; an angle of counterclockwise rotation is defined positive, and an angle of clockwise rotation is defined negative; plane YOZ is a vertical plane; a negative direction of Z axis is a reference direction; an angle between a projection of an arriving signal onto the plane YOZ and the negative direction of Z axis is defined as the vertical incident angle AOA_V; an angle of counterclockwise rotation is positive, and an angle of clockwise rotation is defined negative. Each of the AOA_H and AOA_V is in a range from 0 to 360 degrees.

Figure 8:
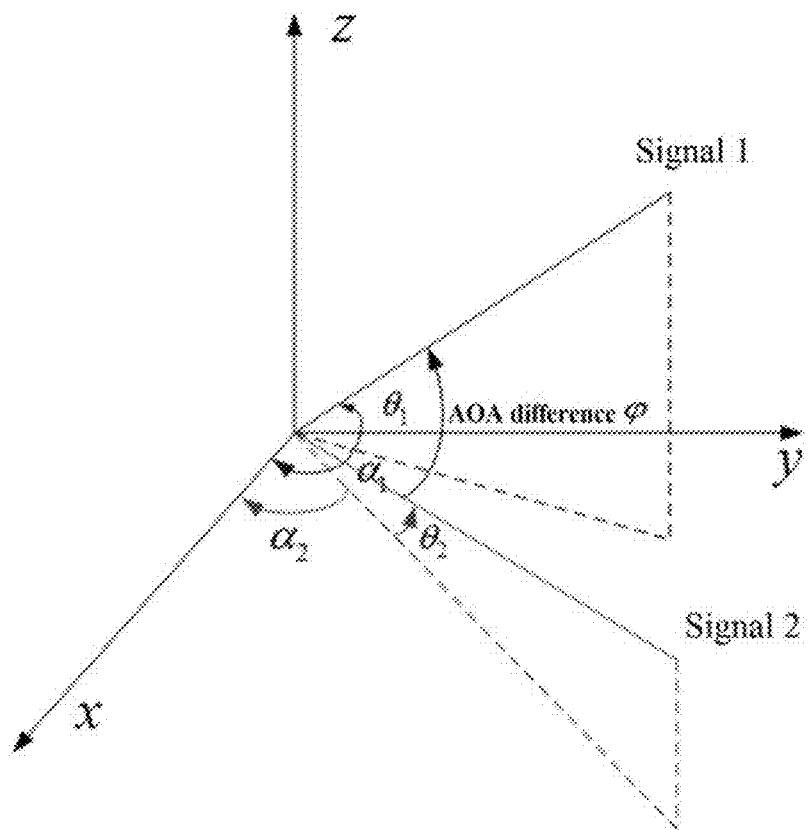
FIG. 8 shows a schematic example of a difference in the angle of arrival.

In the embodiment, the difference in AOA is defined as a difference of three-dimensional angles of AOAs of two received signals. FIG. 8 shows a schematic example of the difference in AOA. In FIG. 8, two received signals are shown as signal 1 and signal 2, and the AOA difference of the signals is represented as $\varphi$. $\alpha_1$ and $\theta_1$ represent the AOA_H and AOA_V, respectively, for signal 1 on a base station antenna. $\alpha_2$ and $\theta_2$ represent the AOA_H and AOA_V, respectively, for signal 2 on the base station antenna. $\alpha_1$, $\theta_1$, $\alpha_2$, and $\theta_2$, may be measured by the base station.

Figures 9, 10:
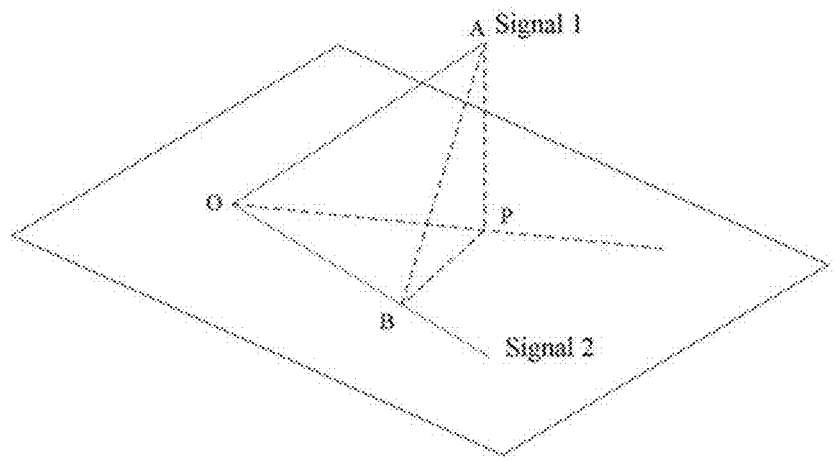
FIG. 9 shows a schematic diagram of calculating a difference between two angles of arrival based on information thereof.
FIG. 10 is a diagram showing all possible calculation results of the difference in the angle of arrival.

FIG. 9 shows a schematic diagram of calculating a difference between the two AOAs based on information thereof ($\alpha_1$, $\theta_1$, $\alpha_2$, and $\theta_2$). First, a plane at an angle of $\theta_2$ relative to plane XOY is made, and the plane intersects, at a ray OP, with a plane formed by the Z axis and signal 1. A point A is assumed in a direction of signal 1, a line AP is drawn perpendicular to a plane containing signal 2, with a pedal being P, and a line BP is drawn from P perpendicular to a direction of signal 2, with an intersection of point B. Since plane OPB is perpendicular to plane OPA, AP is perpendicular to BP. Based on the three-ray theorem, there is $$\cos(\angle AOB) = \cos(\angle AOP)\cos(\angle POB) + \sin(\angle AOP)\sin(\angle POB)\cos(\angle APB) \quad (1)$$

In the equation (1), $\angle AOP = \theta_2 - \theta_1$, $\angle POB = \alpha_2 - \alpha_1$, and $\angle AOB = \varphi$. Further, since AP is perpendicular to BP, $\angle APB = 90°$, and equation (1) is transformed as $$\cos(\varphi) = \cos(\theta_2 - \theta_1)\cos(\alpha_2 - \alpha_1) \quad (2)$$

Therefore, the base station can calculate the difference between AOAs based on AOA_H and AOA_V of each of signal 1 and signal 2.

A specific operation of the allocating unit 103 is described by taking the scenario shown in FIG. 2 and the scheme for pilot division and allocation as shown in FIG. 3 to FIG. 5 as an example.

For example, a base station of a serving cell (cell 3) is to allocate pilots for UAV x and UAV y in sector C. Since subset I is allocated to UAVs in sector C, pilots within subset I, i.e., P1 and P2 may be allocated to UAV x and UAV y. The base station of the serving cell has learned, from the second information, the AOA_H and AOA_V of a signal received by an adjacent base station from each GUE in cell 1 and cell 2 in a case that the GUE uses P1 or P2. Based on equation (2), when pilot P1 is allocated to a UAV (UAV x or UAV y), for each of adjacent cell 1 and cell 2, a difference between the AOA of an interference signal received by the cell from the UAV and the AOA of a signal received by the cell from a GUE thereof may be calculated as:

$$\cos(\varphi_{1A}) = \cos(\theta_{UAV} - \theta_{1A})\cos(\alpha_{UAV} - \alpha_{1A}) \quad (3)$$

$$\cos(\varphi_{2A}) = \cos(\theta_{UAV} - \theta_{2A})\cos(\alpha_{UAV} - \theta_{2A}) \quad (4)$$

In equation (3), $\theta_{1A}$ represents the difference, in a case that pilot P1 is allocated to the UAV, between the AOA of an interference signal received by the adjacent cell 1 from the UAV and the AOA of a signal received by the adjacent cell 1 from a GUE thereof using pilot 1. $\theta_{UAV}$ represents the AOA_V of the interference signal received by the adjacent cell 1 from the UAV, $\alpha_{UAV}$ represent the AOA_H of the interference signal received by the adjacent cell 1 from the UAV; and $\theta_{1A}$ and $\alpha_{1A}$ represent the AOA_V and AOA_H of the signal received by the adjacent cell 1 from the GUE of cell 1 using P1, respectively. As an approximation, the AOA_V of the signal received by an adjacent cell 1 from the GUE may be considered as 0.

Similarly, in equation (4), $\varphi_{2A}$ represents the difference, in a case that pilot P1 is allocated to the UAV, between the AOA of an interference signal received by the adjacent cell 2 from the UAV and the AOA of a signal received by the adjacent cell 2 from a GUE thereof using pilot P1. $\theta_{UAV}$ represents the AOA_V of the interference signal received by the adjacent cell 2 from the UAV, $\alpha_{UAV}$ represents the AOA_H of the interference signal received by the adjacent cell 2 from the UAV; and $\theta_{2A}$ and $\alpha_{2A}$ represent the AOA_V and AOA_H of the signal received by the adjacent cell 2 from the GUE of cell 2 using P1, respectively.

In a similar way, assuming that P2 is allocated to the UAV, for each of adjacent cell 1 and cell 2, a difference between the AOA of an interference signal received by the cell from the UAV and the AOA of a signal received by the cell from a GUE thereof using pilot P2 may be calculated, as $\varphi_{1B}$ and $\varphi_{2B}$, respectively.

For pilot P1, the allocating unit 102 may calculate an average AOA difference as:

$$\overline{\varphi}_{UAV}^{P1} = \varphi_{1A} + \varphi_{2A} \quad (5)$$

Similarly, for pilot P2, the allocating unit 102 may calculate an average AOA difference as:

$$\overline{\varphi}_{UAV}^{P2} = \varphi_{1B} + \varphi_{2B} \quad (6)$$

Since sector C includes two UAVs, i.e., UAV x and UAV y. Different pilots need to be allocated to the two UAVs. Therefore, calculations need to be performed for all possible cases, and FIG. 10 is a diagram showing all possible calculation results of the AOA difference. In FIG. 10, $\overline{\varphi}_x^{P1} = \varphi_{1A} + \varphi_{2A}$, and represents a sum of the differences between the AOA for the UAV x and each of the AOAs for GUEs using the same pilot P1 in cell 1 and in cell 2 (equivalent to equation (5) with UAV being UAV x), when the UAV x is allocated with the pilot P1; and $\overline{\varphi}_x^{P2} = \varphi_{1B} + \varphi_{2B}$, and represents a sum of the differences between the AOA for the UAV x and each of the AOAs for GUEs using the same pilot P2 in cell 1 and in cell 2 (equivalent to equation (6) with UAV being UAV x), when the UAV x is allocated with the pilot P2. Similarly, $\overline{\varphi}_y^{P1}$ and $\overline{\varphi}_y^{P2}$ each represent a sum of the differences between the AOA for the UAV y and each of the AOAs for GUEs using the same pilot in cell 1 and in cell 2, when the UAV y is allocated with the pilot P1 and P2, respectively.

Therefore, when pilot P1 is allocated to UAV x and pilot P2 is allocated to UAV y, the sum of the differences between AOAs is calculated as $\overline{\varphi}_x^{P1} + \overline{\varphi}_y^{P2}$; and when pilot P2 is allocated to UAV x and pilot P1 is allocated to UAV y, the sum of the differences between AOAs is calculated as $\overline{\varphi}_x^{P2} + \overline{\varphi}_y^{P1}$. The allocating unit 102 is configured to select a pilot allocation scheme that maximizes the sum of differences between AOAs.

It should be understood that the above examples are only for the convenience of illustrating the operation of the allocating unit 102, and are not limiting.

It can be seen that the allocating unit 102 can use only the differences in AOA to optimize the pilot allocation scheme, without using the channel parameter, which, on the one hand, may be carried out before the UAV transmits a signal, and on the other hand, has a simple calculation, a fast optimization speed, and a small amount of information interaction since the AOA differences are relatively stable.

As described above, the acquiring unit 103 may acquire, from an adjacent base station, the second information for an adjacent cell corresponding to the adjacent base station. The second information may indicate the AOA for all GUE in the adjacent cell. Alternatively, the second information may only indicate the AOA for a GUE in an adjacent sector which is allocated with a pilot in the first subset.

For example, the acquiring unit 103 may acquire the second information in one or more of the following ways: periodically; and when the AOA for a GUE changes to a predetermined degree. In other words, the acquiring unit 103 is configured to update the second information when necessary.

For example, if the second information is acquired periodically, a period of acquiring the second information may be determined based on a movement speed of the GUE. The AOA may change fast when the GUE moves fast, and the period may be set shorter in order to maintain accuracy. In addition, setting of the period also depends on a requirement on precision.

The second information may be included in an AOA interference indicator (AII), which is configured to report, to the adjacent base station, a measurement result of an AOA on each resource block (corresponding to a pilot).

Furthermore, the acquiring unit 103 is further configured to obtain the first information from the UAV device in one or more of the following manners: periodically; and when the three-dimensional spatial location of the UAV device changes to a predetermined degree. Similarly, setting of the period and setting of the predetermined degree depends on a flight speed of the UAV and/or a requirement of precision in calculation.

The acquiring unit 103 may acquire the first information via one or more of: a physical random access channel (PRACH), a physical uplink control channel (PUCCH), a physical uplink Shared Channel (PUSCH), and an MAC Control Element (MAC CE).

For example, in order to reduce pilot interferences as quickly as possible, the UAV may report the first information indicating its three-dimensional spatial location to the base station of the serving cell via PRACH. The first information may include, for example, the location and an intended flight altitude of the UAV.

Figure 11:
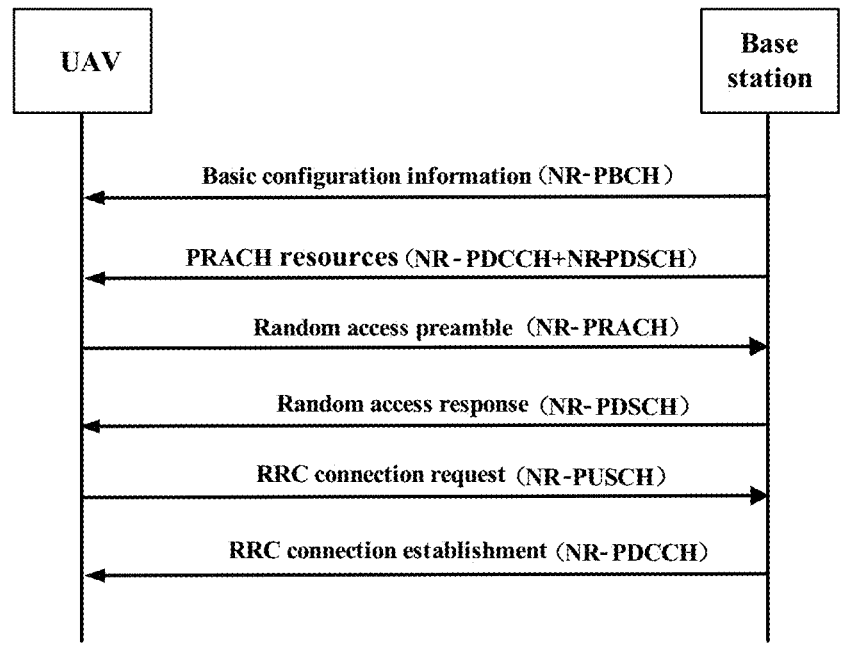
FIG. 11 shows a schematic diagram of an information procedure between a UAV and a base station.

FIG. 11 shows a schematic diagram of an information procedure between a base station (such as a gNB) and a UAV. Through this information procedure, the UAV randomly accesses into the gNB. Generally, a random access (RA) procedure may be used for uplink synchronization, channel switching or scheduling request. The gNB transmits basic configuration information to the UAV through a NR-PBCH (Physical Broadcast Channel), and configures PRACH resources for the UAV, including configurations of NR-PDCCH and NR-PDSCH. The UAV then transmits a random access preamble to the gNB via a NR-PRACH. For example, the UAV selects a random access preamble (Msg.1) from all available preambles and transmits the random access preamble to the gNB. The preamble portion is a Zadoff-Chu sequence generated by cyclic shift of a common root sequence with ideal autocorrelation properties. The first information may be included in the signaling transmitted via a PRACH.

Figure 12:
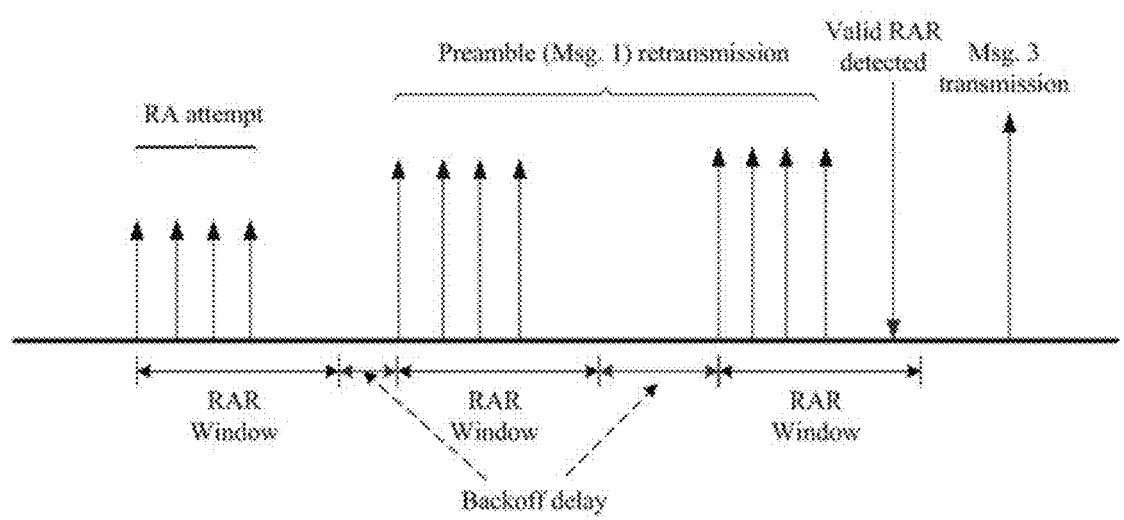
FIG. 12 shows a schematic diagram of transmission under an M-Msg.1 scheme.
Figure 16:
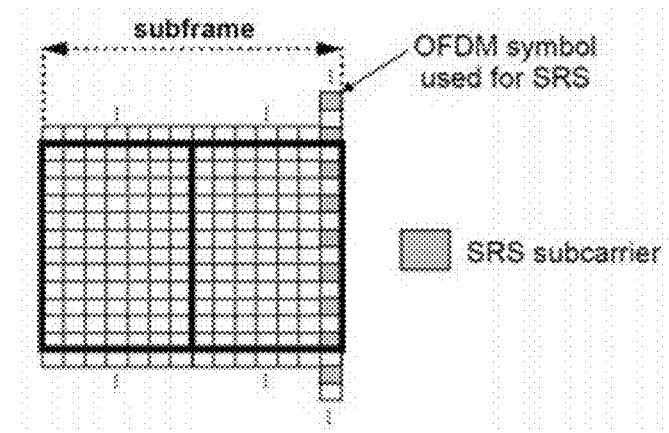
FIG. 16 shows a schematic diagram of a comb-like structure of a sounding reference signal.

In NR, an M-Msg.1 scheme may be used, that is, UE is allowed to attempt to transmit multiple preambles in one random access, thereby increasing probability of successful access and reducing an access delay. If the UE does not receive any information from the gNB in a random access response (RAR) window, the preambles are retransmitted after a random backoff delay. FIG. 12 shows a schematic diagram of transmission under the M-Msg.1 scheme, in which the UE transmits 4 preambles in one RA, and waits for a response from the base station in the RAR window. Since no response from the base station is received, the preambles are retransmitted twice after the random backoff delay, and a valid RAR is finally detected in the third RAR window.

In the case adopting of such a scheme, the first information of the UAV may be located at a part of positions of the transmitted random access preambles. FIG. 13 shows an example of a position of the first information. In FIG. 13, positions for the last two preambles are replaced with the first information. In this way, the base station receives the first information at the same time as receiving the preamble, so as to determine the pilot to be used by the UAV based on the first information and the second information acquired from an adjacent base station, and allocate the pilot to the UAV in an RAR transmitted subsequently. As shown in FIG. 11, the RAR may be transmitted through PDSCH, and it may also allocate other radio resources to the UAV. With such scheme, pilot interferences can be reduced as quickly as possible.

In another example, the first information is included in uplink control information (UCI) transmitted via the PDCCH. For example, the UCI includes a Hybrid Automatic Retransmission Request (HARQ) feedback, Channel State Information (CSI), Scheduling Request (SR), and the like. The NR PUCCH is flexible in terms of allocation of frequency and time, which allows supporting UE with smaller bandwidth on NR carriers and effectively utilizing available resources in terms of coverage and capacity, as shown in FIG. 14. Exemplarily, a new UCI may be defined for reporting the first information.

In another example, the first information may be transmitted in a process of a radio resource control (RRC) connection, such as in an RRC connection request, as shown in FIG. 11. An RRC connection request signaling is performed on PUSCH to which pilot signals and other radio resources have been allocated. In other words, the first information may be transmitted through the PUSCH.

The PUSCH is used to transmit an uplink shared channel (UL-sch) and layer 1/2 control information. The UL-sch is a transmitting channel used to transmit an uplink transmission block. The UAV may report the first information, such as its location and predetermined flight altitude, through the PUSCH. During the RRC connection, the first information may be included in a flightPathInfoReport message. For example, information about the flight altitude may be added to an existing flightPathInfoReport message. In a case that a flight path or the predetermined flight altitude of the UAV changes, such a change may be reported immediately through the PUSCH.

In yet another example, the first information may be transmitted with a MAC CE. MAC CE is an MAC layer control signaling used between a gNB and UE. Each type of MAC CE is identified uniquely by a special logical channel identifier (LCID) value. In order to realize using the MAC CE to transmit the first information, a new LCID may be defined. FIG. 15 shows an example of a newly added MAC CE type, in which an index represents a value of a newly defined LCID that uniquely identifies the newly added MAC CE. It should be understood that FIG. 15 is just an example, and a definition of LCID is not limited thereto.

In addition, the electronic apparatus 100 may further report, to the base station of the adjacent cell, information of the AOA for a GUE in the serving cell, where the AOA includes a horizontal incident angle and a vertical incident angle. In this way, a base station of the adjacent cell can allocate a pilot to a UAV in the adjacent cell based on the information in the manner described above.

For example, the electronic apparatus 100 may report the information in one or more of the following ways: periodically; and when the AOA for the GUE in the serving cell changes to a predetermined degree. In this way, the base station of the adjacent cell can update the information of the AOA for the GUE in the serving cell in time. For example, a period of reporting the information may be determined based on a movement speed of the GUE. In addition, the period may be determined considering a requirement of precision in calculation.

In summary, with the electronic apparatus 100 according to the embodiment, interferences between a UAV and a ground UE is minimized by distinguishing the UAV and the ground UE and adopting a pilot allocation strategy for the UAV. In the embodiment, a pilot allocation scheme based on maximizing the AOA difference is adopted, so that computational complexity is reduced and efficiency of pilot allocation is improved.

Second Embodiment

In the embodiment, the allocating unit 102 is further configured to change a pattern of the pilot allocated to the UAV device based on the flight altitude of the UAV device. In 5G NR, there are four kinds of physical reference signals, among which a Sounding Reference Signal (SRS) and a Demodulation Reference Signal (DMRS) are uplink reference signals. The SRS is used for uplink channel estimation, and the DMRS is used for channel estimation of a demodulation-related channel. The pilot mentioned here may include the SRS or the DMRS.

Figure 17:
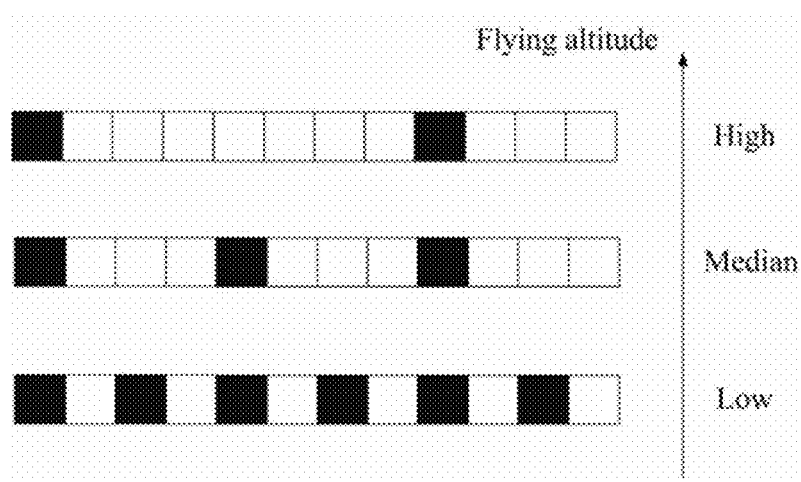
FIG. 17 shows a schematic diagram of a sparse comb-like structure of a sounding reference signal.
Figure 18:
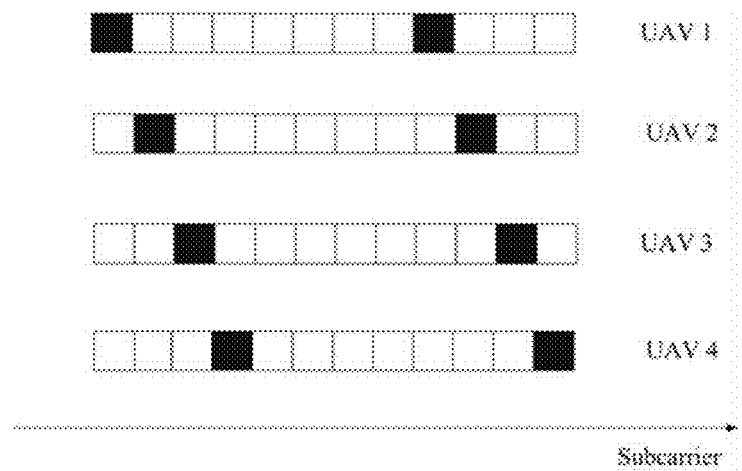
FIG. 18 shows a schematic diagram of an example in which multiple UAVs transmit sounding reference signals simultaneously.

For example, the allocating unit 102 may be configured to employ a sparser comb-like structure for the SRS as the flight altitude of the UAV device increases. As specified in 3GPP TS 38.211, the SRS is transmitted in the last few symbols of a sub frame, with a comb-like structure as shown. As the flight altitude of the UAV increases, a probability of a transmitted signal reaching a base station via an LOS path increases. In this case, due to an increased coherence bandwidth of the channel, a frequency response of the channel becomes flatter, and a sparser comb-like structure may be used, as shown in FIG. 17. The comb-like structure of the SRS becomes sparser as the flight altitude increases. By using such configuration, not only a channel sounding performance (power spectral density) may be improved, but also the number of UEs that transmit SRS simultaneously using idle subcarriers may be increased. FIG. 18 is a schematic diagram showing an example in which multiple UAVs transmit sounding reference signals simultaneously.

Figure 19:
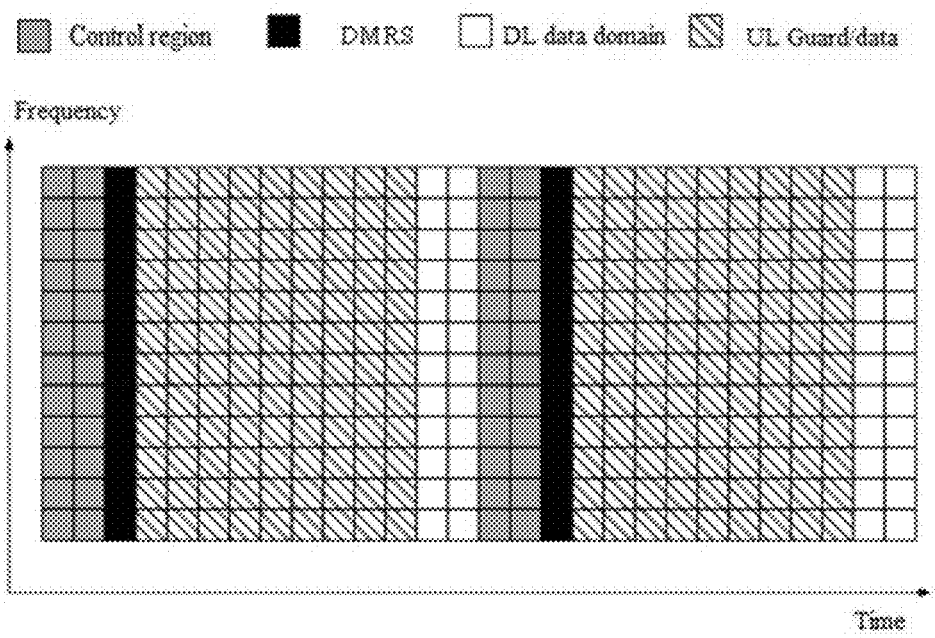
FIG. 19 shows an example of a location of time-frequency resources for a front loaded demodulation reference signal.
Figure 20:
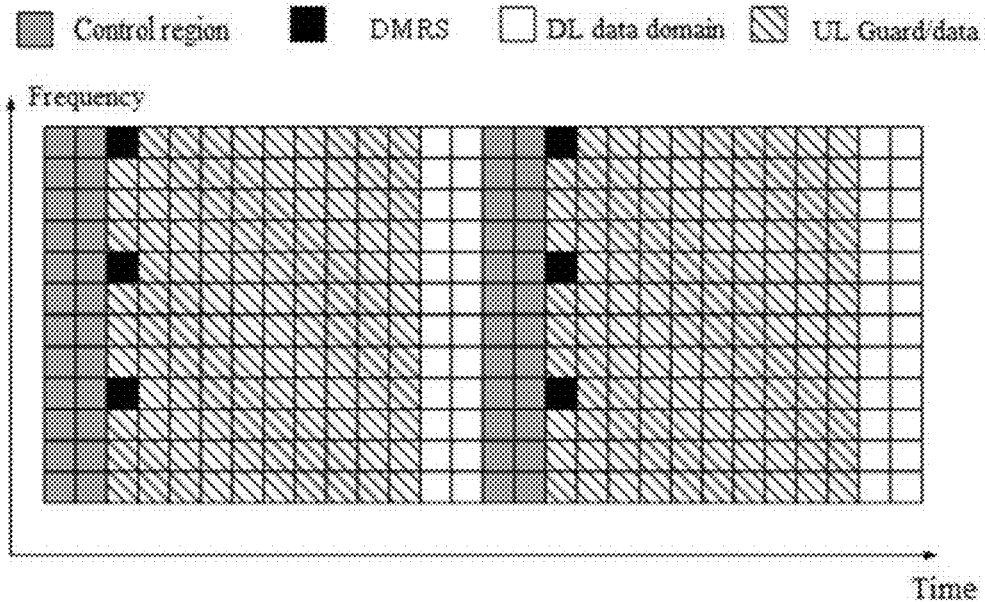
FIG. 20 shows a schematic diagram of a demodulation reference signal pattern with reduced density in frequency domain.
Figure 21:
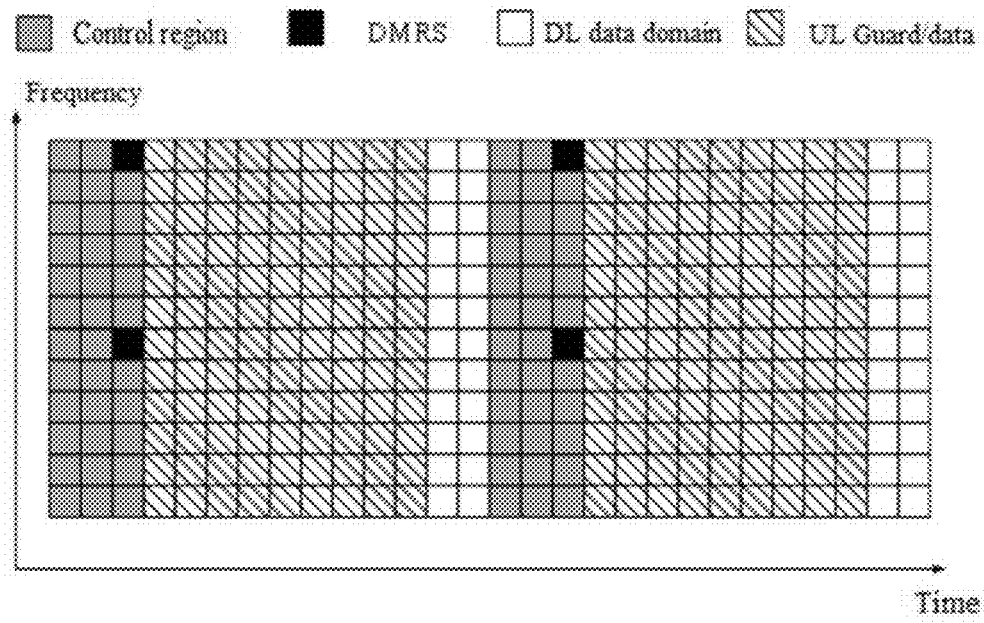
FIG. 21 shows a schematic diagram of another demodulation reference signal pattern with reduced density in frequency domain.

As another example, the allocating unit 102 may be configured to reduce a frequency domain density of the DMRS as the flight altitude of the UAV device increases. In a time domain resource grid, a front loaded DMRS is located after a control region and before a data region, as shown in FIG. 19, in which a black filled part represents the DMRS. As mentioned above, as the flight altitude increases, the transmitted signal of the UAV is likely to reach a base station through an LOS path. In this case, a delay spread would become shorter (equivalent to an increase in the coherence bandwidth of the channel). The allocating unit 102 may reduce the frequency domain density of the DMRS without significantly reducing precision in the channel estimation, so as to reduce an overhead incurred by the DMRS, and the saved subcarriers may be reused by the data region or the control region. Exemplarily, FIG. 20 shows a schematic diagram of a DMRS pattern in which the DMRS occupies 3 subcarriers in each resource block, and the saved subcarriers are reused by a data region. FIG. 21 shows a schematic diagram of a DMRS pattern in which the DMRS occupies 2 subcarriers in each resource block, and the saved subcarriers are reused by a control region.

In summary, with the electronic apparatus 100 according to the embodiment, a system capacity can be improved by increasing the number of UEs that simultaneously transmit SRS, and/or a spectrum utilization can be improved by reducing a DMRS overhead.

Third Embodiment

Figure 22:
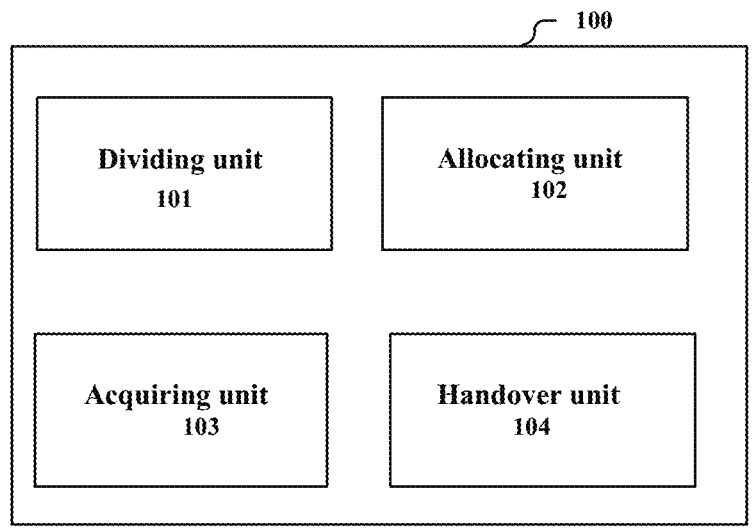
FIG. 22 shows a block diagram of functional modules of an electronic apparatus for wireless communications according to another embodiment of the present disclosure.

A UAV may fly over multiple cells during the flight. In order to reduce the number of cell handovers in this process, this embodiment proposes a solution of vertical handover. Correspondingly, the electronic apparatus 100 may further include a handover unit 104 for performing a vertical handover, as shown in FIG. 22.

Figure 23:
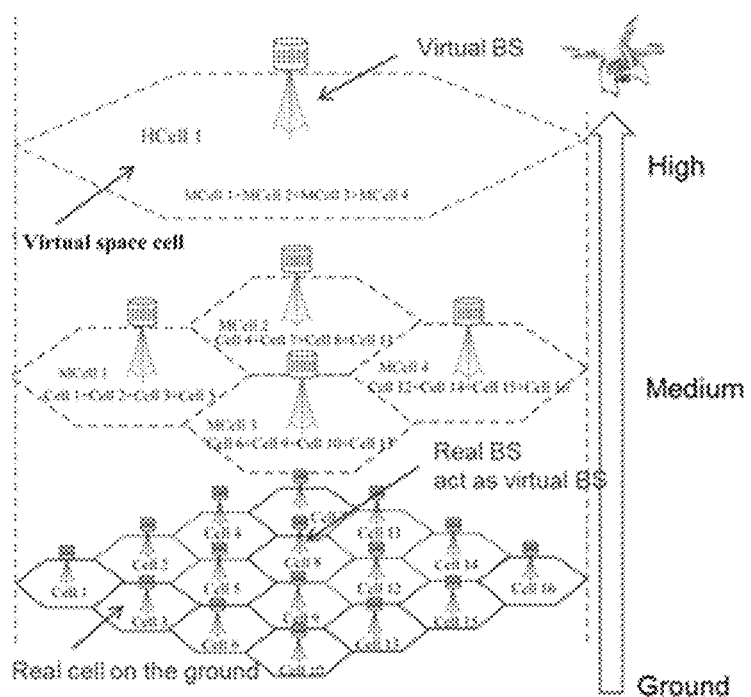
FIG. 23 shows a schematic example of a virtual space cell and a virtual base station.

In an example, the handover unit 104 is configured to perform the virtual vertical handover when a flight altitude of the UAV device increases to a predetermined level, in order to hand over the UAV device to a virtual base station at a corresponding altitude. A function of the virtual base station is realized by a ground base station in a corresponding horizontal region. In this example, it is assumed that there are a virtual space cell and a virtual base station. FIG. 23 shows a schematic example of a virtual space cell and a virtual base station.

Figure 24:
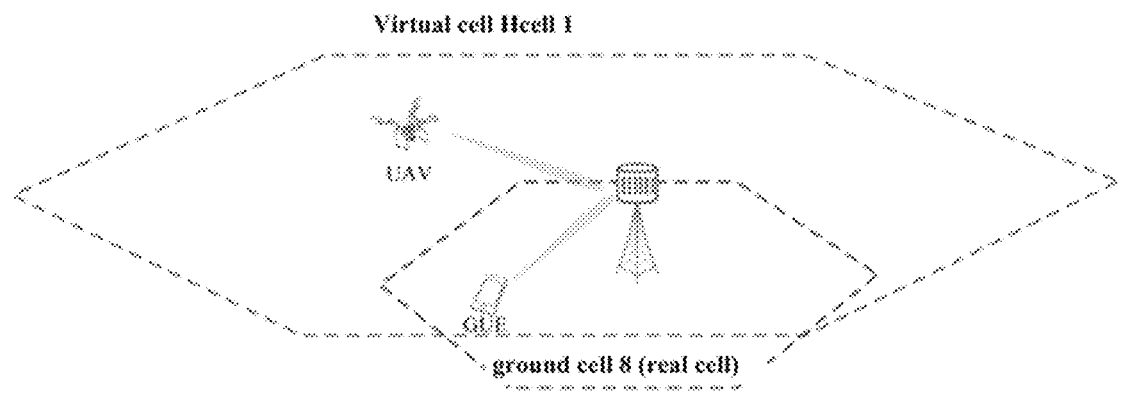
FIG. 24 shows a schematic diagram of an example in which a base station of a ground cell serves both a UAV at the high altitude and a GUE.

In the example shown in FIG. 23, a space is vertically divided into three levels, i.e., high, medium, and ground. Multiple cells such as cell 1 to cell 16 are arranged on the ground, and these cells are real and each has a real base station. In the medium space and high space, it is assumed that there are multiple virtual space cells and corresponding virtual base stations. In the medium space corresponding to the ground as shown, there are virtual space cells Mcell 1 to Mcell 4. Taking Mcell 1 as an example, its horizontal coverage area is a sum of coverage areas of cell 1, cell 2, cell 3 and cell 5, and a base station of the ground cell corresponding to a central part of the horizontal coverage area of Mcell 1 may be designated as a virtual base station of Mcell 1. For example, the base station of the ground cell 2 may be designated as the virtual base station of Mcell 1. Similarly, in the high space corresponding to the ground as shown, there is a virtual space cell Hcell 1, whose horizontal coverage area is a sum of horizontal coverages areas of the virtual space cells Mcell 1 to Mcell 4. The base station of the ground cell corresponding to a central part of Hcell 1 may be designated as a virtual base station of Hcell 1. For example, the base station of the ground cell 8 may be designated as the virtual base station of Hcell 1. In this case, the base station of the ground cell 8 serves both a UAV within the high-space coverage of Hcell 1 and a GUE in the cell 8, as shown in FIG. 24.

It can be seen that the coverage area of the virtual space cell increases as an altitude increases. Correspondingly, as the flight altitude increases, a signal form a UAV may reach more base stations, and the UAV can fly faster at a higher altitude to quickly fly over multiple ground cells in a horizontal direction. Therefore, when the flight altitude of the UAV reaches a certain altitude, the UAV may be vertically handed over from an original ground cell to a corresponding virtual space cell, so as to avoid frequent handover between ground cells and reduce signaling overhead. In addition, when the flight altitude of the UAV is further increased, virtual vertical handover between different levels may also be performed.

Figure 25:
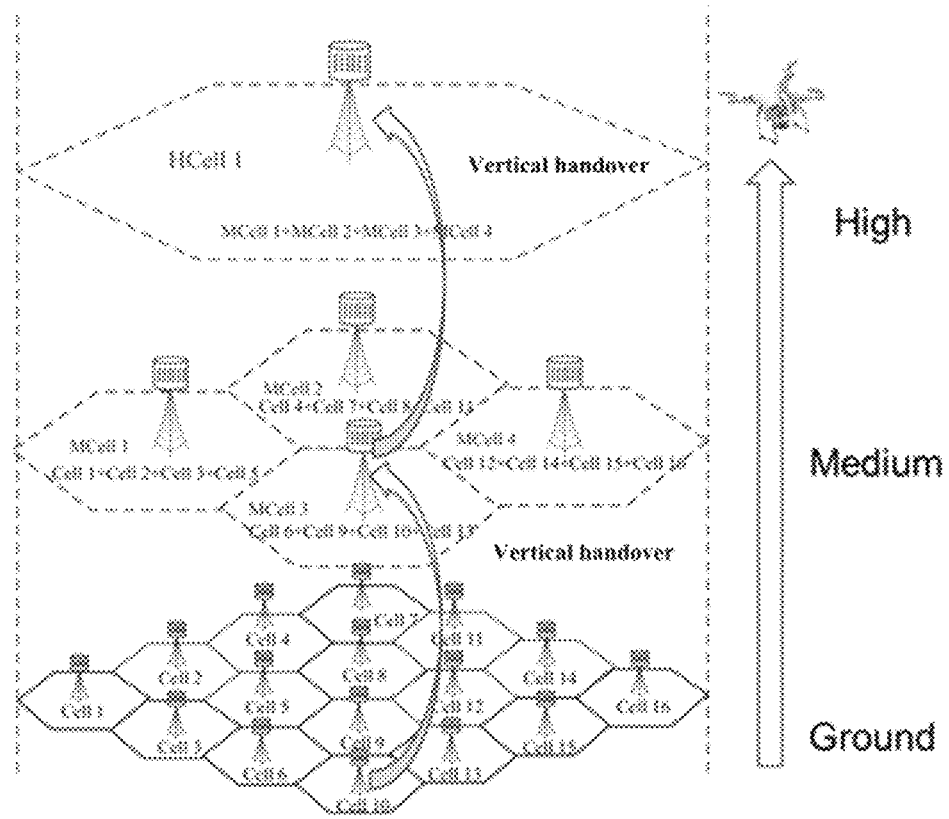
FIG. 25 shows a schematic example of virtual vertical handover.

FIG. 25 shows a schematic example of virtual vertical handover. When a UAV takes off within cell 10 and reaches a medium space, a virtual vertical handover from cell 10 to Mcell 3 occurs. The virtual base station of Mcell 3 is the base station of cell 9, and therefore the UAV is handed over from the base station of cell 10 to the base station of cell 9. Further, when the UAV flies into the high space, for example, a virtual vertical handover from Mcell 3 to Hcell 1 occurs, and the UAV is handed over from the base station of cell 9 to the base station of cell 8, where the base station of cell 8 serves as the virtual base station of Hcell 1.

It should be understood that FIG. 23 shows only an example of levels in a vertical direction, and the present disclosure is not limited thereto, and more levels of virtual space cells are possible.

In another example, the handover unit 104 is configured to perform a vertical handover when a flight altitude of a UAV device increases to a predetermined degree, to hand over the UAV device to a space base station. For example, the space base station may be located on a high altitude platform station (HAPS).

In this example, there is an HAPS such as an airship, satellite or a large UAV that covers the space cell. Similarly, the space base station or a corresponding space cell may also have a hierarchical structure, that is, space base stations for different levels are arranged at different altitudes.

The UAV, when flies into the air, no longer requires control from a ground base station. In this case, a vertical handover may be performed to hand over the UAV from a ground base station to a space base station. Further, when the flight altitude changes, handover may be performed between space base stations.

Figure 26:
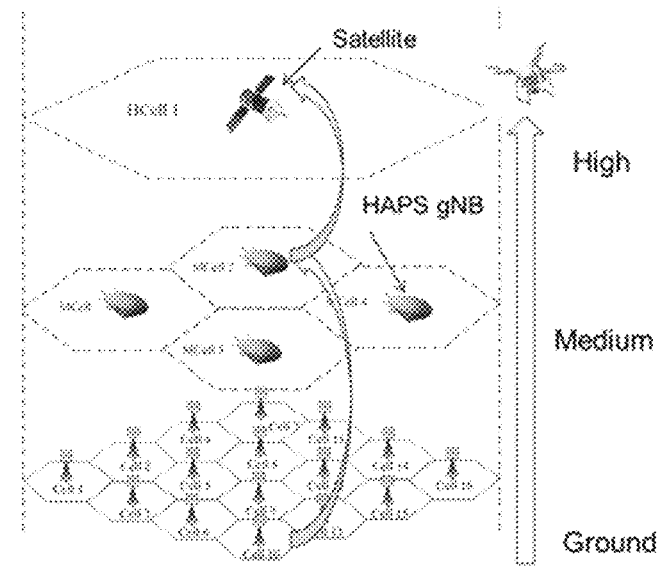
FIG. 26 shows a schematic diagram of an example of a handover of a UAV to a space base station.

FIG. 26 shows a schematic diagram of an example of a handover of a UAV to a space base station. When the UAV takes off within cell 10 and reaches a medium space, a vertical handover from cell 10 to Mcell 2 occurs. The space base station of Mcell 2 is on an airship, and therefore the UAV is handed over from the base station of cell 10 to the space base station on the airship. Further, when the UAV enters a high space, for example, a vertical handover from Mcell 2 to Hcell 1 occurs, and the UAV is handed over from the space base station on the airship to the space base station of Hcell 1 on a satellite.

Figure 27:
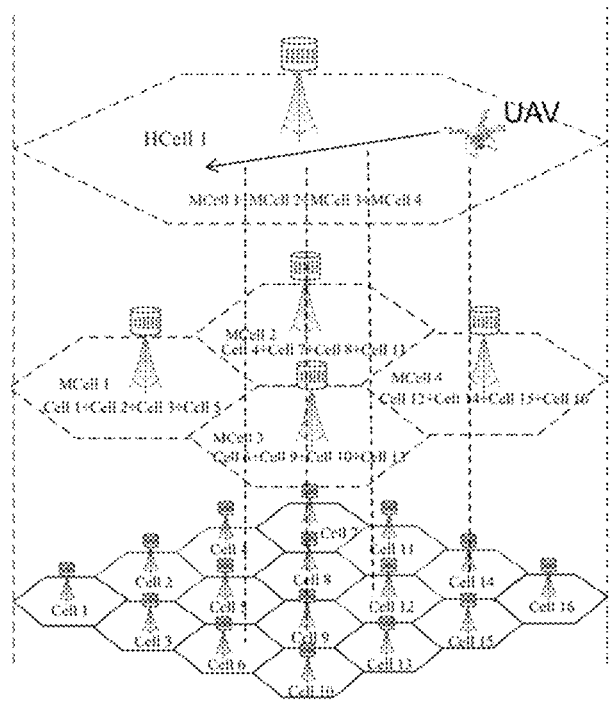
FIG. 27 shows an example where a flying UAV is to traverse multiple cells.

In this embodiment, a space cell is defined for the purpose of a centralized management of UAVs, in order to optimize a system configuration based on movement characteristics of the UAVs, and additionally reduce a huge signaling overhead when the UAV is handed over among ground cells. For example, with the massive antennas and millimeter wave technology, a density of 5G system base stations is about 40 to 50 per square kilometer, i.e., a cell has a radius of about 80 meters. In this case, a flying UAV may traverse multiple cells in a short time, for example, traverse cell 14, cell 12, cell 9, and cell 6 as shown in FIG. 27, resulting in a large amount of inter-cell handover signaling. In this embodiment, by defining a space cell with a larger area, the UAV is vertically handed over to the space cell, which significantly reduces this kind of signaling overhead.

Fourth Embodiment

Figure 28:
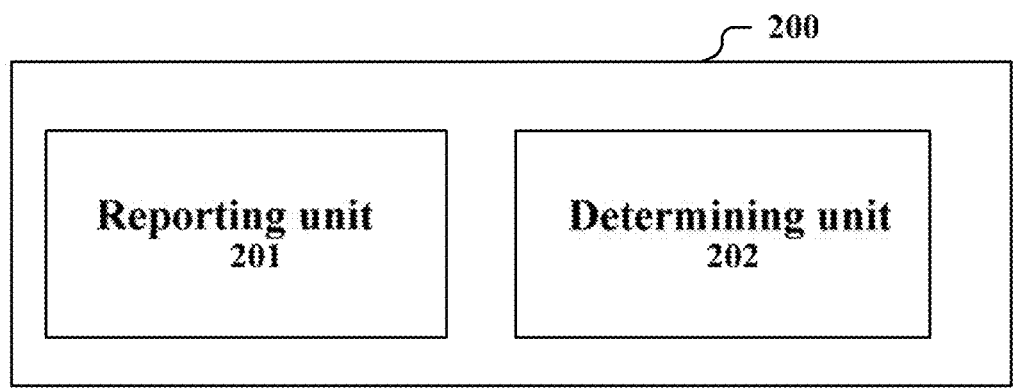
FIG. 28 shows a block diagram of functional modules of an electronic apparatus for wireless communications according to another embodiment of the present disclosure.

FIG. 28 shows a block diagram of functional modules of an electronic apparatus 200 according to another embodiment of the present disclosure. As shown in FIG. 28, the electronic apparatus 200 includes: a reporting unit 201 configured to report, to a base station, a three-dimensional spatial location of a UAV device; and a determining unit 202 configured to determine a pilot allocated to the UAV device by the base station based on the information. The pilot allocated to the UAV device belongs to a first subset of available pilots, and the first subset is different from a second subset allocated to another UAV device in an adjacent sector within a different cell, and the first subset is different from a third subset allocated to a GUE within the same sector as the UAV device.

The reporting unit 201 and the determining unit 202 may be implemented by one or more processing circuits, and the processing circuits may be implemented as a chip or a processor, for example. Moreover, it should be understood that each functional unit in the electronic apparatus shown in FIG. 28 is only a logical module divided according to the specific functions implemented by the functional units, and is not used to limit the specific implementation manner.

The electronic apparatus 200 may be provided on a UAV side or communicatively connected to a UAV. It should be further noted here that electronic apparatus 200 may be implemented at a chip level or a device level. For example, the electronic apparatus 200 may function as the UAV itself, and may also include external devices such as a memory, and a transceiver (not shown). The memory may be configured to store programs required for performing various functions by the UAV and related data information. The transceiver may include one or more communication interfaces to support communication with different apparatus (for example, a base station, and another UE). An implementation of the transceiver is not specifically limited here.

For example, the three-dimensional spatial location of the UAV device may include a two-dimensional position and a flight altitude of the UAV device. Information of the three-dimensional spatial location of the UAV device in this embodiment is equivalent to the first information described in the first embodiment, and reference may be made to the detailed description in the first embodiment, which is not repeated here.

The reporting unit 201 may report the above-mentioned information in one or more of the following ways: periodically; and when the three-dimensional spatial location of the UAV device changes to a predetermined degree.

The reporting unit 201 may be configured to report the above-mentioned information via one or more of the following: PRACH, PUCCH, PUSCH, or MAC CE.

For example, the information may be placed at a part of positions of random access preambles transmitted by the UAV device via the PRACH, and an example thereof is described in detail with reference to FIG. 12 and FIG. 13 in the first embodiment, and is not repeated here. The information may also be included in uplink control information transmitted via the PUCCH, an example of which is described in detail with reference to FIG. 14 in the first embodiment, and is not repeated here. The information may be included in the RRC connection request or in a flight-PathInfoReport message during an RRC connection, examples of which are described in detail with reference to FIG. 11 in the first embodiment, and is repeated here. In addition, the information may be transmitted by using MAC CE. In order to realize such a manner, a new type of MAC CE may be added, and a new LCID may be defined to uniquely represent the newly added MAC CE.

After receiving the information, a base station may allocate a pilot to the UAV based on the information and transmit an indication to the UAV, and the determining unit 202 determines the allocated pilot based on the indication. The UAV may then perform transmission using the pilot. Since the pilot is orthogonal to the pilot for a GUE in the same sector as the UAV and the pilot for a UAV in an adjacent sector, pilot interferences are effectively reduced.

In addition, a pattern of the pilot may be changed based on a change in the flight altitude, as described in the second embodiment, which is not repeated here.

As the flight altitude increases, the UAV may perform a virtual vertical handover to a virtual space cell or perform a vertical handover to a space cell, so as to reduce signaling overhead. Related description thereof is given in the third embodiment and is not repeated here.

To sum up, with the electronic apparatus 200 according to the present embodiment, interferences between a UAV and a ground UE is minimized by distinguishing the UAV and the ground UE and adopting a pilot allocation scheme for the UAV.

Fifth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 29:
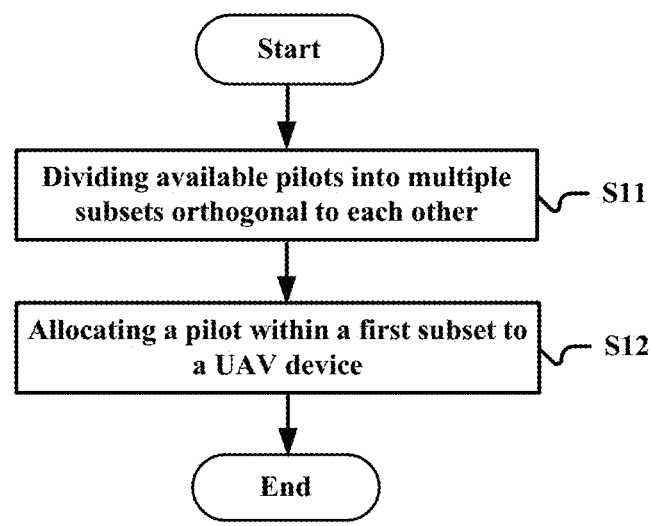
FIG. 29 shows a flowchart of a method for wireless communications according to an embodiment of the present disclosure.

FIG. 29 shows a flowchart of a method for wireless communications according to an embodiment of the present disclosure. The method includes: dividing available pilots into multiple orthogonal subsets (S11); allocating, to a UAV device, a pilot in a first subset (S12), where the first subset is different from a second subset allocated to another UAV device located within an adjacent sector of a different cell, and the first subset is different from a third subset allocated to a ground UE located within the same sector as the UAV. The method may be performed on a base station side, for example.

In an example, one or more of the subsets may be reserved for the UAV device in each sector after the pilots are divided into the subsets in advance. Alternatively, steps of the method may be performed in response to the access of a UAV device.

Figure 30:
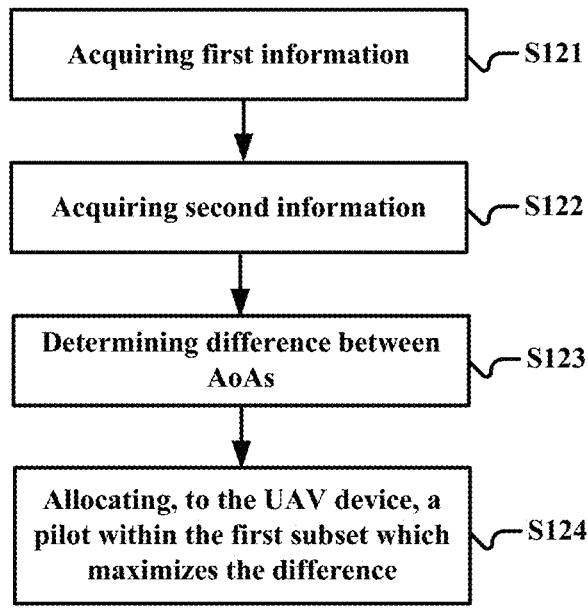
FIG. 30 is a diagram showing an example of a flow of a step S12 in FIG. 29.

As shown in FIG. 30, in an example, step S12 includes: acquiring first information (S121) indicating a three-dimensional spatial location of the UAV device; acquiring second information (S122) indicating an AOA of a signal received by a base station of each adjacent cell from each ground UE of the adjacent cell, where the AOA includes a horizontal incident angle and a vertical incident angle; determining, based on at least a part of the first information and the second information, a difference between an AOA of a signal received by the base station of the adjacent cell from the UAV device and an AOA of a signal received by the base station of the adjacent cell from its ground UE in a case that the ground UE of the adjacent cell uses the same pilot as the UAV device (S123); and allocating, to the UAV device, a pilot within the first subset which maximizes the difference (S124).

For example, the three-dimensional spatial location of the UAV device includes a two-dimensional position and a flight altitude of the UAV device. In step S121, the first information may be acquired from the UAV device in one or more of the following ways: periodically; and when the three-dimensional spatial location of the UAV device changes to a predetermined degree.

The first information may be acquired via one or more of: a physical random access channel, a physical uplink control channel, a physical uplink shared channel, a MAC control element. For example, the first information is located at a part of positions of random access preambles transmitted by the UAV device via the physical random access channel. In addition, the first information may be included in uplink control information transmitted via the physical uplink control channel. The first information may be included in a flightPathInfoReport message during a radio resource control connection. The MAC control element for transmitting the first information may be uniquely identified using a newly defined logical channel identifier (LCID).

In step S122, the second information for the adjacent cell may be acquired from an adjacent base station. The second information is included, for example, in an AOA interference indicator. The second information may indicate an AOA for a ground UE within an adjacent sector, which is allocated with a pilot in the first subset.

The second information may be acquired in one or more of the following ways: periodically; and when the AOA for the ground UE changes to a predetermined degree. The period for acquiring the second information may be determined based on a movement speed of the ground UE.

In addition, although not shown in the figure, the method may further include: changing a pattern of the pilot allocated to the UAV device based on the flight altitude of the UAV device. For example, as the flight altitude of the UAV device increases, a sparser comb-like structure may be used for the SRS, and/or a frequency domain density of the DMRS may be reduced.

In addition, a virtual vertical handover can be performed when the flight altitude of the UAV device increases to a predetermined level, to hand over the UAV device to a virtual base station at a corresponding altitude, where a function of the virtual base station is performed by a ground base station in a corresponding horizontal area.

Alternatively, a virtual vertical handover can be performed when the flight altitude of the UAV device increases to a predetermined level, to hand over the UAV device to a space base station, which is located on a high altitude platform station.

In addition, the method may further include: reporting information of the AOA for a ground UE of a serving cell to the base station of the adjacent cell. The information may be reported in one or more of the following ways: periodically; and when the AOA for the ground UE changes to a predetermined degree. A period of reporting the information may be determined based on a movement speed of the ground UE.

Figure 31:
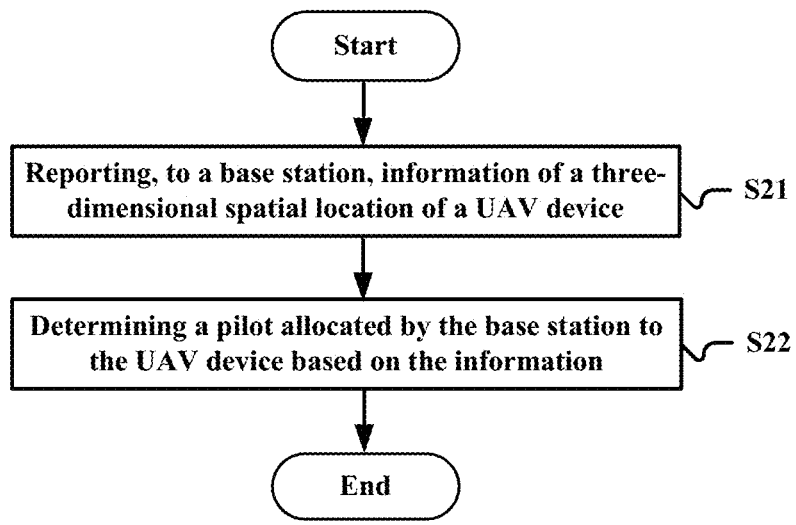
FIG. 31 shows a flowchart of a method for wireless communications according to an embodiment of the present disclosure.

FIG. 31 shows a flowchart of a method for wireless communications according to another embodiment of the present disclosure. The method includes: reporting, to a base station, information of a three-dimensional spatial location of a UAV device (S21); and determining a pilot allocated to the UAV device by the base station based on the information (S22). The pilot allocated to the UAV device belongs to a first subset of available pilots. The first subset is different from a second subset allocated to another UAV device located within an adjacent sector of a different cell; and the first subset is different from a third subset allocated to a ground UE located within the same sector as the UAV device. The method may be performed on a UAV side, for example.

In an example, the three-dimensional spatial location of the UAV device includes a two-dimensional position and a flight altitude of the UAV device. In step S21, the information may be reported via one or more of the following: a physical random access channel, a physical uplink control channel, a physical uplink shared channel, and an MAC control element.

For example, the information may be placed at a part of positions of random access preambles transmitted by the UAV device via the physical random access channel. The information may be included in uplink control information transmitted via the physical uplink control channel. The information may be included in the radio resource control connection request. The information may be contained in a flightPathInfoReport message during a radio resource control connection. The MAC control element used to transmit the information is uniquely identified using a newly defined logical channel identifier (LCID).

It is noted that the above-mentioned methods may be used in combination or individually, and details thereof are described in detail in the first embodiment to the fourth embodiment, which are not repeated here.

The technology according to the present disclosure is applicable to various products.

For example, the electronic apparatus 100 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipment may each serve as a base station by performing functions of the base station temporarily or semi-permanently.

The electronic apparatus 200 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

APPLICATION EXAMPLES REGARDING A BASE STATION

First Application Example

Figure 32:
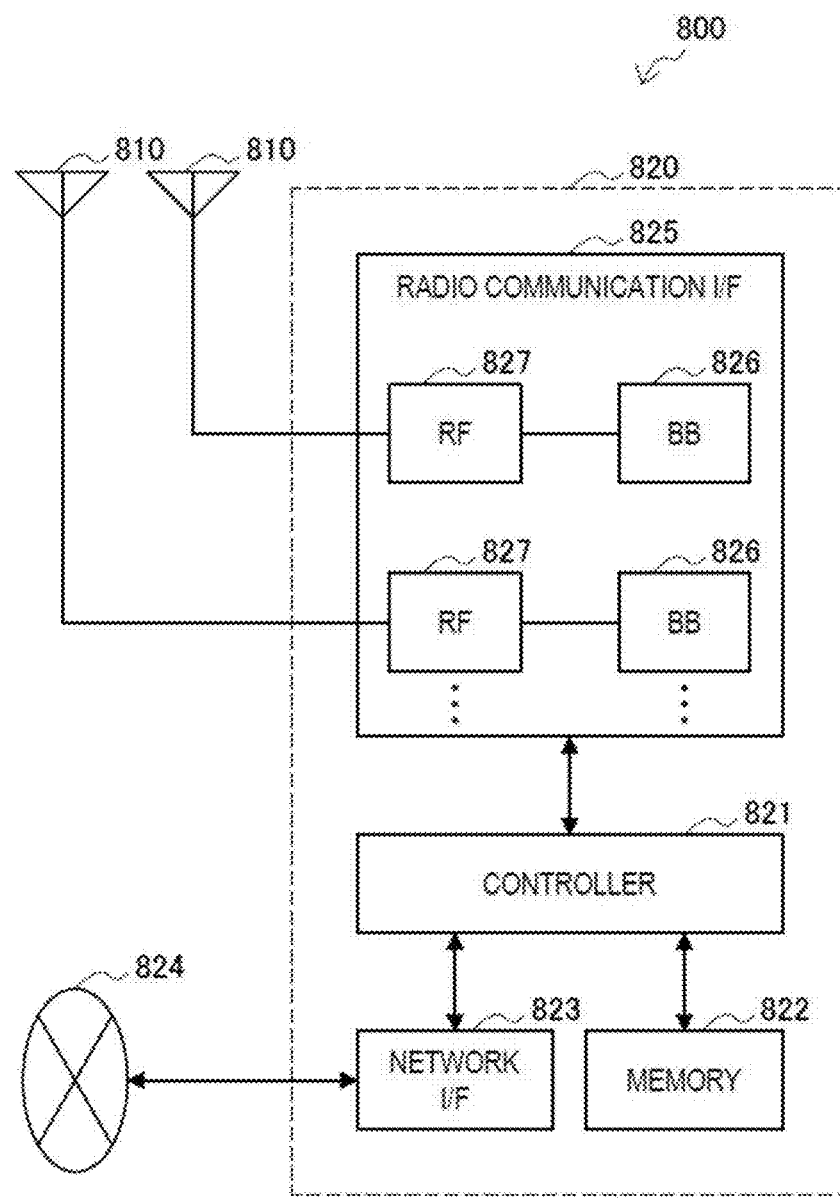
FIG. 32 is a block diagram showing a first example of an exemplary configuration of an eNB or gNB to which the technology of the present disclosure may be applied.

FIG. 32 is a block diagram showing a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 32, the eNB 800 may include the multiple antennas 810. For example, the multiple antennas 810 may be compatible with multiple frequency bands used by the eNB 800. Although FIG. 32 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 32, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 32. For example, the multiple RF circuits 827 may be compatible with multiple antenna elements. Although FIG. 32 shows the example in which the radio communication interface 825 includes multiple BB processors 826 and multiple RF circuits 827, the radio communication interface 825 may include a single BB processor 826 and a single RF circuit 827.

In the eNB 800 shown in FIG. 32, the acquiring unit 103 and a transceiver of the electronic apparatus 100 may be implemented by the radio communication interface 825. At least a part of the functions may also be implemented by the controller 821. For example, the controller 821 may divide the pilots into multiple subsets and allocate a pilot to a UAV by performing the functions of the dividing unit 101, the allocating unit 102, and the acquiring unit 103; and the controller 821 may further perform a virtual vertical handover or a vertical handover of the UAV by performing the function of the handover unit 104.

Second Application Example

Figure 33:
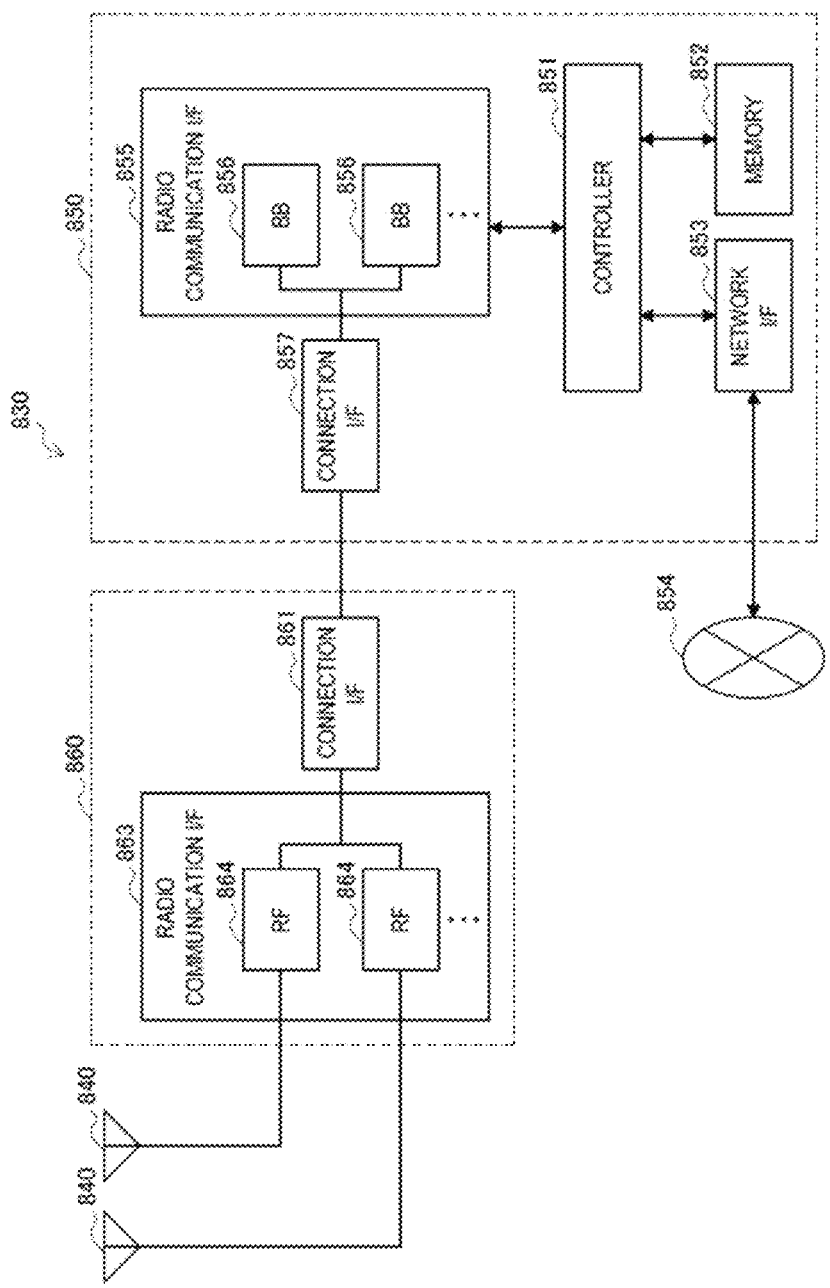
FIG. 33 is a block diagram showing a second example of an exemplary configuration of an eNB or gNB to which the technology of the present disclosure may be applied.

FIG. 33 is a block diagram showing a second example of an exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 33, the eNB 830 may include multiple antennas 840. For example, the multiple antennas 840 may be compatible with multiple frequency bands used by the eNB 830. Although FIG. 33 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 32.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 32, except that the BB processor 856 is connected to an RF circuit 864 of the RRH 860 via the connection interface 857. As show in FIG. 33, the radio communication interface 855 may include multiple BB processors 856. For example, the multiple BB processors 856 may be compatible with multiple frequency bands used by the eNB 830. Although FIG. 33 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 33. For example, the multiple RF circuits 864 may support multiple antenna elements. Although FIG. 33 shows the example in which the radio communication interface 863 includes multiple RF circuits 864, the radio communication interface 863 may include a single RF circuit 864.

In the eNB 830 shown in FIG. 33, the acquiring unit 103 and a transceiver of the electronic apparatus 100 may be implemented by the radio communication interface 855 and/or the radio communication interface 863. At least a part of the functions may also be implemented by the controller 851. For example, the controller 851 may divide the pilots into multiple subsets and allocate a pilot to a UAV by performing the functions of the dividing unit 101, the allocating unit 102, and the acquiring unit 103; and the controller 851 may further perform a virtual vertical handover or a vertical handover of the UAV by performing the function of the handover unit 104.

APPLICATION EXAMPLES REGARDING USER EQUIPMENT

First Application Example

Figure 34:
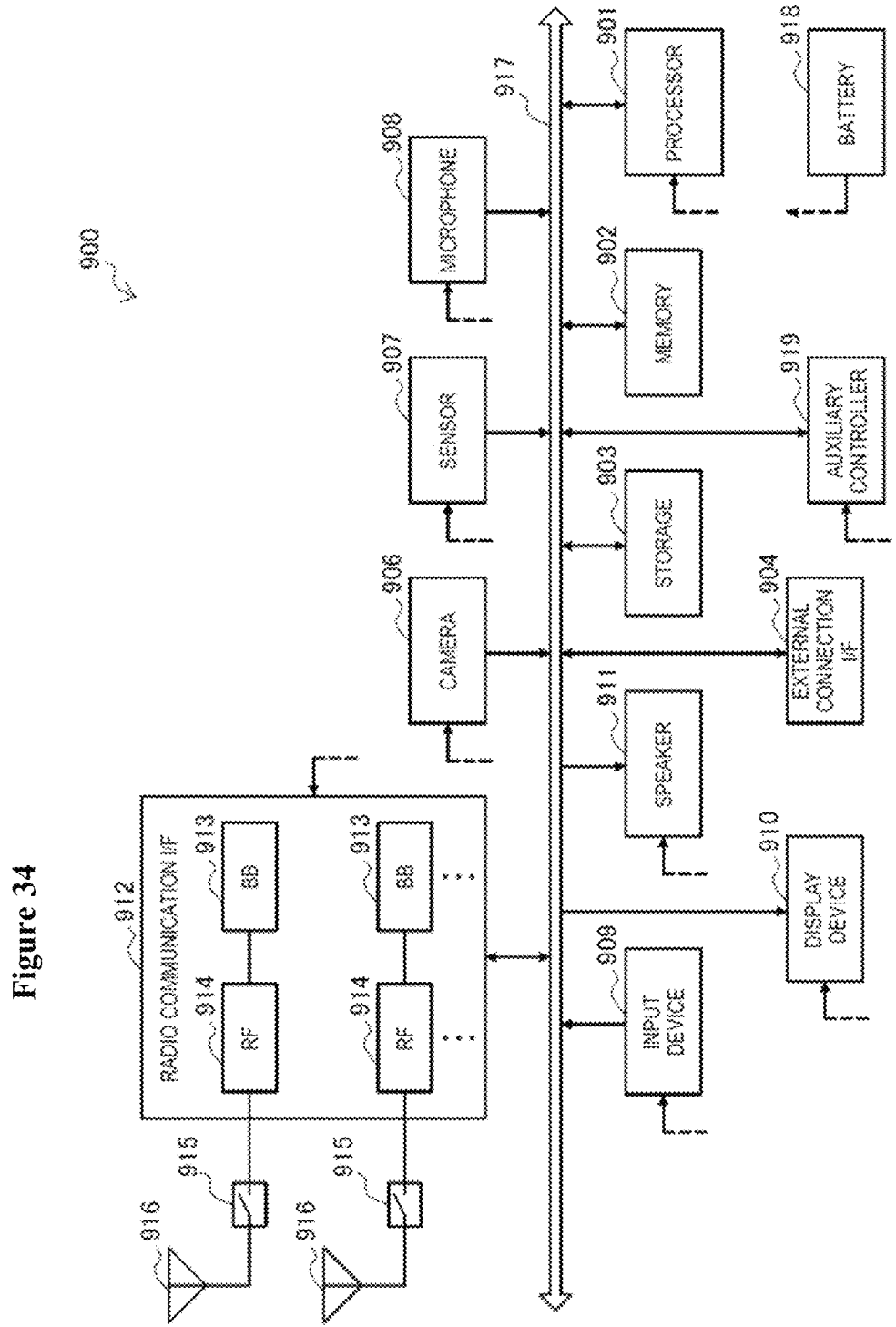
FIG. 34 is a block diagram showing an example of an exemplary configuration of a smartphone to which the technology according to the present disclosure may be applied.

FIG. 34 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 34 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 34. Although FIG. 34 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 34. Although FIG. 34 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 34 via feeder lines, which are partially shown as dashed lines in FIG. 34. The auxiliary controller 919 operates a minimum necessary function of the smartphone 900, for example, in a sleep mode.

In the smart phone 900 shown in FIG. 34, the reporting unit 201 and a transceiver of the electronic apparatus 200 may be implemented by the radio communication interface 912. At least a part of the functions may be implemented by the processor 901 or the auxiliary controller 919. For example, the processor 901 or the auxiliary controller 919 may perform the functions of the reporting unit 201 and the determining unit 202 to report three-dimensional location information of the UAV where the smart phone is located and determine a pilot allocated to the smart phone by a base station.

Second Application Example

Figure 35:
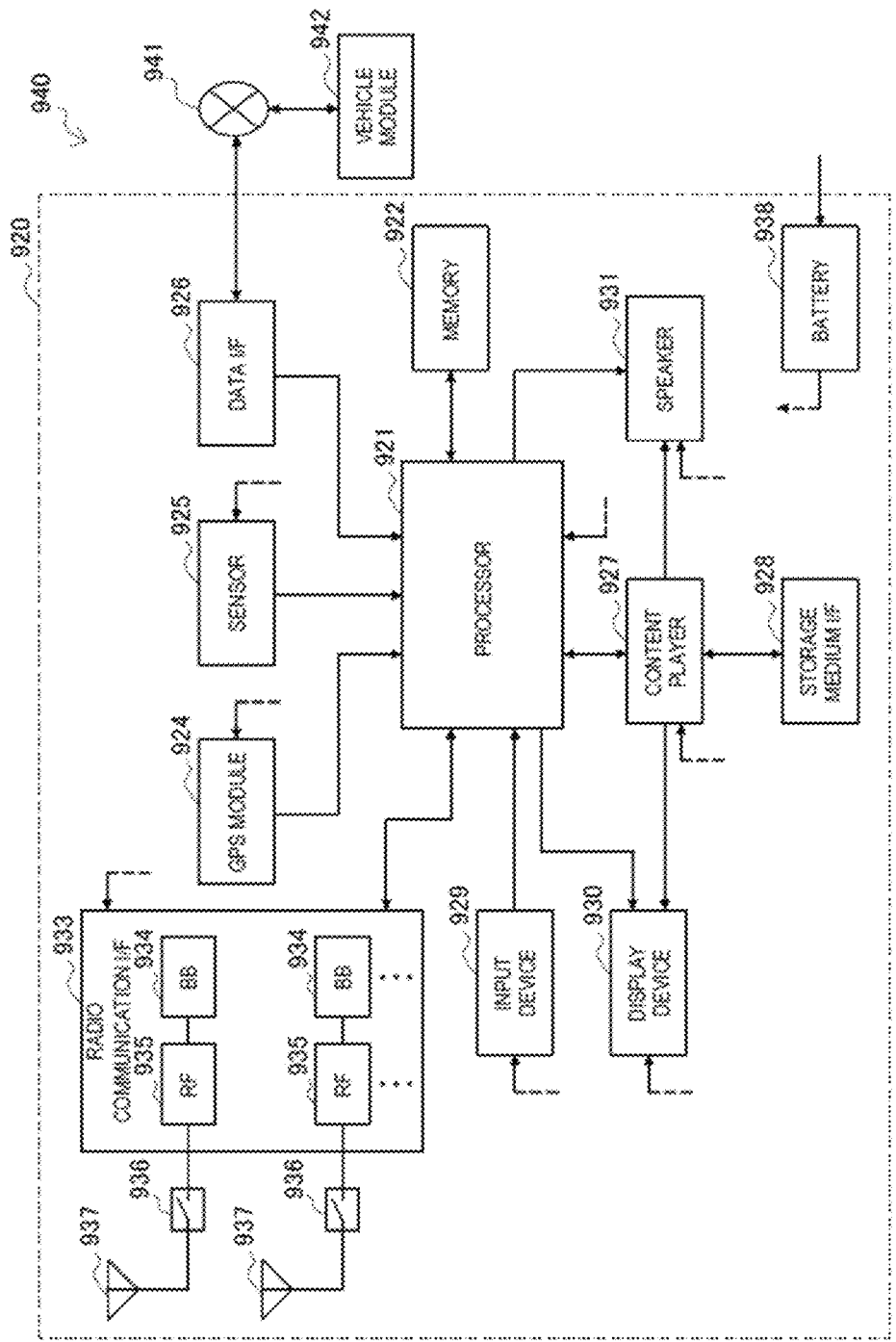
FIG. 35 is a block diagram showing an example of an exemplary configuration of a car navigation apparatus to which the technology according to the present disclosure may be applied.

FIG. 35 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 35. Although FIG. 35 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 35, the car navigation apparatus 920 may include multiple antennas 937. Although FIG. 22 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 35 via feeder lines that are partially shown as dash lines in FIG. 35. The battery 938 accumulates power supplied from the vehicle.

In the car navigation device 920 shown in FIG. 35, the reporting unit 201 and a transceiver of the electronic apparatus 200 may be implemented by the radio communication interface 933. At least a part of the functions may be implemented by the processor 921. For example, the processor 921 may perform the functions of the reporting unit 201 and the determining unit 202 to report three-dimensional location information of the UAV where the smart phone is located and determine a pilot allocated to the smart phone by a base station.

The technology of the present disclosure may also be implemented as an in-vehicle system (or UAV) 940 including one or more blocks of the car navigation apparatus 920, the in-vehicle network 941 and a UAV module 942. The UAV module 942 generates UAV data (such as a speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3600 shown in FIG. 36) from a storage medium or network, wherein the computer is capable of implementing various functions when installed with various programs.

Figure 36:
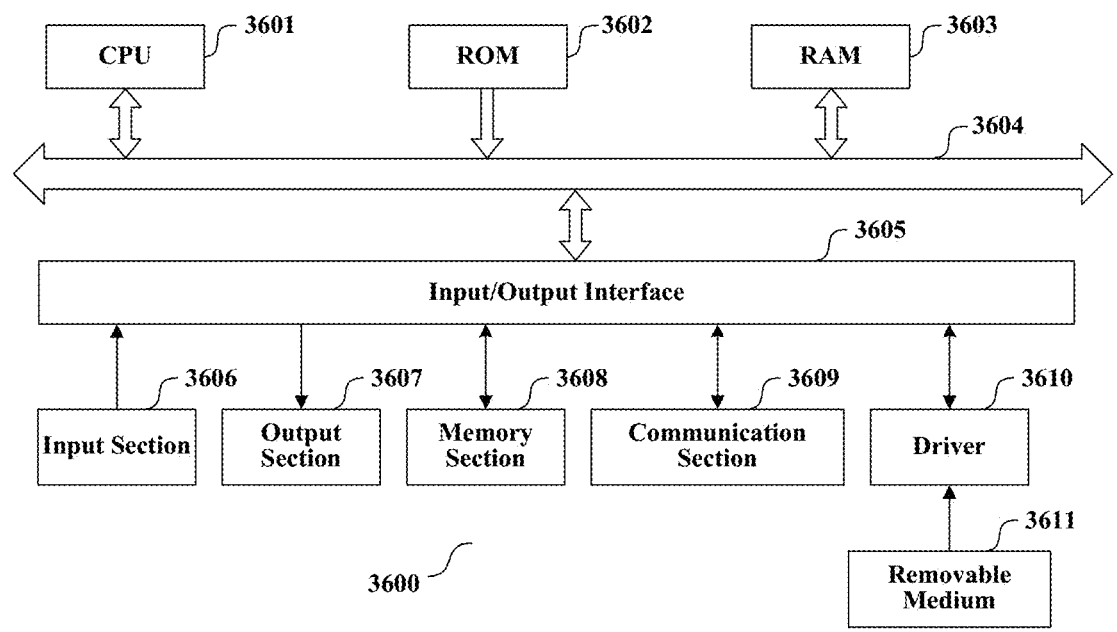
FIG. 36 is a block diagram of an exemplary block diagram illustrating the structure of a general purpose personal computer capable of realizing the method and/or device and/or system according to the embodiments of the present disclosure.

In FIG. 36, a central processing unit (CPU) 3601 executes various processing according to a program stored in a read-only memory (ROM) 3602 or a program loaded to a random access memory (RAM) 3603 from a memory section 3608. The data needed for the various processing of the CPU 3601 may be stored in the RAM 3603 as needed. The CPU 3601, the ROM 3602 and the RAM 3603 are linked with each other via a bus 3604. An input/output interface 3605 is also linked to the bus 3604.

The following components are linked to the input/output interface 3605: an input section 3606 (including keyboard, mouse and the like), an output section 3607 (including displays such as a cathode ray tube (CRT), a liquid crystal display (LCD), a loudspeaker and the like), a memory section 3608 (including hard disc and the like), and a communication section 3609 (including a network interface card such as a LAN card, modem and the like). The communication section 3609 performs communication processing via a network such as the Internet. A driver 3610 may also be linked to the input/output interface 3605, if needed. If needed, a removable medium 3611, for example, a magnetic disc, an optical disc, a magnetic optical disc, a semiconductor memory and the like, may be installed in the driver 3610, so that the computer program read therefrom is installed in the memory section 3608 as appropriate.

In the case where the foregoing series of processing is achieved through software, programs forming the software are installed from a network such as the Internet or a memory medium such as the removable medium 3611.

It should be appreciated by those skilled in the art that the memory medium is not limited to the removable medium 3611 shown in FIG. 36, which has program stored therein and is distributed separately from the apparatus so as to provide the programs to users. The removable medium 3611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 3602 and the memory section 3608 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   divide available pilots into a plurality of subsets orthogonal to each other; and
   allocate a pilot within a first subset to an unmanned aerial vehicle (UAV) device, wherein the first subset is different from a second subset allocated to another UAV device located within an adjacent sector of a different cell, and the first subset is different from a third subset allocated to a ground UE located within the same sector as the UAV device, wherein the processing circuitry is further configured to:
acquire first information indicating a three-dimensional spatial location of the UAV device;
acquire second information indicating an angle of arrival (AOA) of a signal received by a base station of each adjacent cell from each ground UE of the adjacent cell, the angle of arrival comprising a horizontal incident angle and a vertical incident angle;
determine, based on at least a part of the first information and the second information, a difference between an AOA of a signal received by the base station of the adjacent cell from the UAV device and an AOA of a signal received by the base station of the adjacent cell from its ground UE in a case that the ground UE of the adjacent cell uses the same pilot as the UAV device; and
allocate, to the UAV device, a pilot within the first subset which maximizes the difference.

2. The electronic apparatus according to claim 1, wherein the processing circuitry is configured to reserve, after dividing the available pilots into a plurality of subsets, one or more of the subsets for the UAV device in each sector.

3. The electronic apparatus according to claim 1, wherein the processing circuitry is further configured to perform the dividing of the subsets and the allocating of the pilots in response to access of a UAV device.

4. The electronic apparatus according to claim 1, wherein the processing circuitry is configured to acquire the first information from the UAV device in one or more of the following ways: periodically; and when the three-dimensional spatial location of the UAV device changes to a predetermined degree; and/or
wherein the processing circuitry is configured to acquire the first information via one or more of the following: physical random access channel, physical uplink control channel, physical uplink shared channel, MAC control element.

5. The electronic apparatus according to claim 4, wherein the first information is located at a part of positions of random access preambles transmitted by the UAV device via the physical random access channel; or
wherein the first information is comprised in uplink control information transmitted via the physical uplink control channel; or
wherein the first information is comprised in a flightPath-InfoReport message during a radio resource control connection; or
wherein the MAC control element for transmitting the first information is uniquely identified using a newly defined logical channel identifier (LCID).

6. The electronic apparatus according to claim 1, wherein the three-dimensional spatial location of the UAV device includes a two-dimensional position of the UAV device and a flight altitude of the UAV device.

7. The electronic apparatus according to claim 6, wherein, the processing circuitry is further configured to change, according to a flight altitude of the UAV device, a pattern of the pilot allocated to the UAV device.

8. The electronic apparatus according to claim 7, wherein, the processing circuitry is configured to employ a sparser comb-like structure for a sounding reference signal as the flight altitude of the UAV device increases; and/or
wherein the processing circuitry is configured to reduce a frequency domain density of a demodulation reference signal as the flight altitude of the UAV device increases.

9. The electronic apparatus according to claim 6, wherein the processing circuitry is configured to perform, when the flight altitude of the UAV device increases to a predetermined level, a virtual vertical handover to hand over the UAV device to a virtual base station at a corresponding altitude, wherein a function of the virtual base station is performed by a ground base station in a corresponding horizontal area; or
wherein the processing circuitry is configured to perform, when the flight altitude of the UAV device increases to a predetermined level, a vertical handover to hand over the UAV device to a space base station, wherein the space base station is located on a high altitude platform station.

10. The electronic apparatus according to claim 1, wherein the processing circuitry is configured to acquire, from an adjacent base station, second information with respect to the corresponding adjacent cell, wherein the second information is contained in an angle of arrival interference indicator.

11. The electronic apparatus according to claim 10, wherein, the processing circuitry is configured to acquire the second information in one or more of the following ways: periodically; and when the angle of arrival for the ground UE changes to a predetermined degree,
wherein a period for acquiring the second information is determined based on a movement speed of the ground UE.

12. The electronic apparatus according to claim 1, wherein, the second information indicates an angle of arrival for the ground UE in the adjacent sector which is allocated with a pilot within the first subset.

13. An electronic apparatus for wireless communications, comprising:
processing circuitry, configured to:
divide available pilots into a plurality of subsets orthogonal to each other; and
allocate a pilot within a first subset to an unmanned aerial vehicle (UAV) device, wherein the first subset is different from a second subset allocated to another UAV device located within an adjacent sector of a different cell, and the first subset is different from a third subset allocated to a ground UE located within the same sector as the UAV device,
wherein the processing circuitry is further configured to report information of the angle of arrival for a ground UE of a serving cell to a base station of an adjacent cell, wherein the angle of arrival comprises a horizontal incident angle and a vertical incident angle.

14. The electronic apparatus according to claim 13, wherein the processing circuitry is configured to report the information in one or more of the following ways: periodically; and when the angle of arrival for the ground UE changes to a predetermined degree,
wherein a period for reporting the information is determined based on a movement speed of the ground UE.

15. A method for wireless communications, comprising:
dividing available pilots into a plurality of subsets orthogonal to each other; and
allocating a pilot within a first subset to an unmanned aerial vehicle (UAV) device, wherein, the first subset is different from a second subset which is allocated to another UAV device located within an adjacent sector of a different cell, and the first subset is different from a third subset which is allocated to a ground UE located within the same sector as the UAV device,
wherein the method further comprises:
acquiring first information indicating a three-dimensional spatial location of the UAV device;

acquiring second information indicating an angle of arrival (AOA) of a signal received by a base station of each adjacent cell from each ground UE of the adjacent cell, the angle of arrival comprising a horizontal incident angle and a vertical incident angle;

determining, based on at least a part of the first information and the second information, a difference between an AOA of a signal received by the base station of the adjacent cell from the UAV device and an AOA of a signal received by the base station of the adjacent cell from its ground UE in a case that the ground UE of the adjacent cell uses the same pilot as the UAV device; and allocating, to the UAV device, a pilot within the first subset which maximizes the difference.

* * * * *